United States Patent
Tate et al.

(10) Patent No.: US 8,861,881 B2
(45) Date of Patent: Oct. 14, 2014

(54) IMAGE PROCESSING APPARATUS, METHOD THEREOF, PROGRAM, AND IMAGE CAPTURING APPARATUS

(75) Inventors: Shunta Tate, Tokyo (JP); Masafumi Takimoto, Plttsburgh, PA (US); Yusuke Mitarai, Tokyo (JP); Katsuhiko Mori, Kawasaki (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/207,544

(22) Filed: Aug. 11, 2011

(65) Prior Publication Data

US 2012/0045095 A1    Feb. 23, 2012

(30) Foreign Application Priority Data

Aug. 18, 2010  (JP) ................................ 2010-183382

(51) Int. Cl.
*G06K 9/40*    (2006.01)
*G06T 5/00*    (2006.01)
*G06T 7/00*    (2006.01)

(52) U.S. Cl.
CPC ....... *G06T 5/003* (2013.01); *G06T 2207/10016* (2013.01); *G06T 2207/20064* (2013.01); *G06T 2207/20076* (2013.01); *G06T 2207/10024* (2013.01); *G06T 7/0046* (2013.01); *G06T 2207/20016* (2013.01); *G06T 5/005* (2013.01)
USPC ........... 382/254; 345/473; 382/103; 382/118; 382/284

(58) Field of Classification Search
None
See application file for complete search history.

(56) References Cited

U.S. PATENT DOCUMENTS

| | | | |
|---|---|---|---|
| 6,597,801 B1 * | 7/2003 | Cham et al. ................... | 382/103 |
| 7,164,781 B2 | 1/2007 | Kim et al. | |
| 7,254,257 B2 * | 8/2007 | Kim et al. ...................... | 382/118 |
| 7,460,730 B2 * | 12/2008 | Pal et al. ....................... | 382/284 |
| 7,868,925 B2 | 1/2011 | Motomura et al. | |
| 8,447,128 B2 | 5/2013 | Kameyama | |
| 2002/0122573 A1 * | 9/2002 | Eraslan ......................... | 382/118 |

(Continued)

FOREIGN PATENT DOCUMENTS

| | | |
|---|---|---|
| JP | 2004005456 A | 1/2004 |
| JP | 2006350498 A | 12/2006 |

(Continued)

OTHER PUBLICATIONS

B. Julesz, "Textons, the elements of texture perception, and their interactions." Nature 290, Mar. 12, 1981, pp. 91-97.

(Continued)

*Primary Examiner* — Tsung-Yin Tsai
(74) *Attorney, Agent, or Firm* — Fitzpatrick, Cella, Harper & Scinto

(57) ABSTRACT

An image processing apparatus stores model information representing a subject model belonging to a specific category, detects the subject from an input image by referring to the model information, determines a region for which an image correction is to be performed within a region occupied by the detected subject in the input image, stores, for a local region of the image, a plurality of correction data sets representing correspondence between a feature vector representing a feature before correction and a feature vector representing a feature after correction, selects at least one of the correction data sets to be used to correct a local region included in the region determined to undergo the image correction, and corrects the region determined to undergo the image correction using the selected correction data sets.

13 Claims, 21 Drawing Sheets

(56) References Cited

U.S. PATENT DOCUMENTS

| | | | |
|---|---|---|---|
| 2003/0206171 A1* | 11/2003 | Kim et al. | 345/473 |
| 2006/0280380 A1 | 12/2006 | Li | |
| 2012/0075500 A1 | 3/2012 | Kaneda et al. | |

FOREIGN PATENT DOCUMENTS

| | | |
|---|---|---|
| JP | 2008084213 A | 4/2008 |
| JP | 2009253765 A | 10/2009 |
| WO | 2009/087725 A1 | 7/2009 |

OTHER PUBLICATIONS

C. Liu et al., "Nonparametric scene parsing: Label transfer via dense scene alignment," Proceedings of the IEEE Conference on Computer Vision and Pattern Recognition, 2009, pp. 1972-1979.

M. Matsugu et al., "Convolutional spiking neural network model for robust face detection", Proceedings of the Ninth International Conference on Neural Information Processing, 2002, pp. 660-664.

S. Baker, et al., "Hallucinating faces", In IEEE International Conference on Automatic Face and Gesture Recognition, Mar. 2000.

J. Hays, et al., "Scene Completion Using Millions of Photographs", ACM Transactions on Graphics (SIGGRAPH 2007), Aug. 2007, vol. 26, No. 3.

A. Oliva, et al., "Modeling the Shape of the Scene: A Holistic Representation of the Spatial Envelope", Int. Journal of Computer Vision, 42(3):145.175, 2001.

J. Shotton, et al., "TextonBoost for Image Understanding: Multi-Class Object Recognition and Segmentation by Jointly Modeling Texture, Layout, and Context", International Journal of Computer Vision, vol. 81, No. 1 (Jan. 1, 2009), pp. 2-23.

B. Epshtein, et al., "Feature Hierarchies for Object Classification", Proc. IEEE Int. Conf. Comput. Vis. 1, 220.227, 2005.

R. Fergus, et al., "Object Class Recognition by Unsupervised Scale-Invariant Learning", Proceedings of the IEEE CVPR 2003.

P. Felzenszwalb, et al., "A Discriminatively Trained, Multiscale, Deformable Part Model", Proceedings of the IEEE CVPR 2008.

A. C. Berg, et al., "Shape Matching and Object Recognition Using Low Distortion Correspondences", Proceedings of the 2005 IEEE Computer Society Conference on Computer Vision and Pattern Recognition, 2005.

D. G. Lowe, "Object Recognition From Local Scale-Invariant Features", Proceedings of the International Conference on Computer Vision 2: 1150-1157, 1999.

K. Mikolajczyk, et al., "A Comparison of Affine Region Detectors", In IJCV 65(1/2):43-72, 2005.

S. K. Divvala, et al., "An Empirical Study of Context in Object Detection", Proc. of the IEEE Conference on Computer Vision and Pattern Recognition, 2009.

C. Liu, et al., "A Two-Step Approach to Hallucinating Faces: Global Parametric Model and Local Nonparametric Model", in Proceedings of the IEEE Computer Society Conference on Comp ter Vision and Pattern Recognition, 2001.

W. T. Freeman, et al., "Learning Low-Level Vision", International Journal of Computer Vision 40(1), 25-47, 2000.

S. Roweis, et al., "Nonlinear Dimensionality Reduction by Locally Linear Embedding", Science, v.290 No. 5500, Dec. 22, 2000. pp. 2323-2326.

R Fergus, et al., "Removing Camera Shake from a Single Photograph," ACM SIGGRAPH 2006, vol. 25, No. 3, pp. 787-794, Aug. 2006.

E. Sudderth et al., "Signal and Image Processing with Belief Propagation", Signal Processing Magazine, IEEE, vol. 25, Issue 2, Mar. 2008, pp. 114-141.

M. Bertalmio, et al., "Image Inpainting", Proceedings of SIGGRAPH 2000, New Orleans, USA, Jul. 2000.

C. Rother, et al., "GrabCut—Interactive Foreground Extraction Using Iterated Graph Cuts", in ACM Transactions on Graphics (SIGGRAPH), Aug. 2004.

* cited by examiner

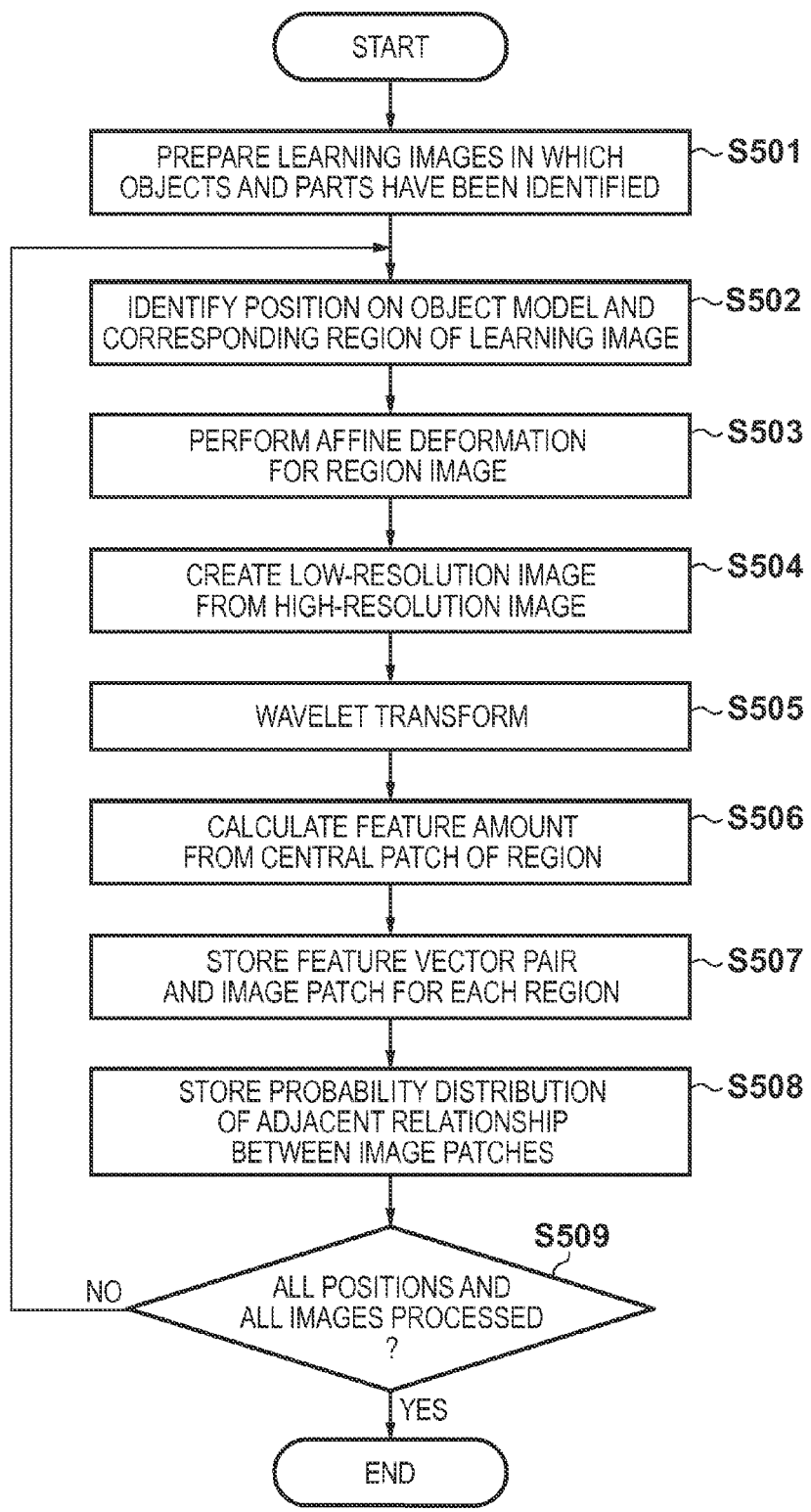

F I G. 14
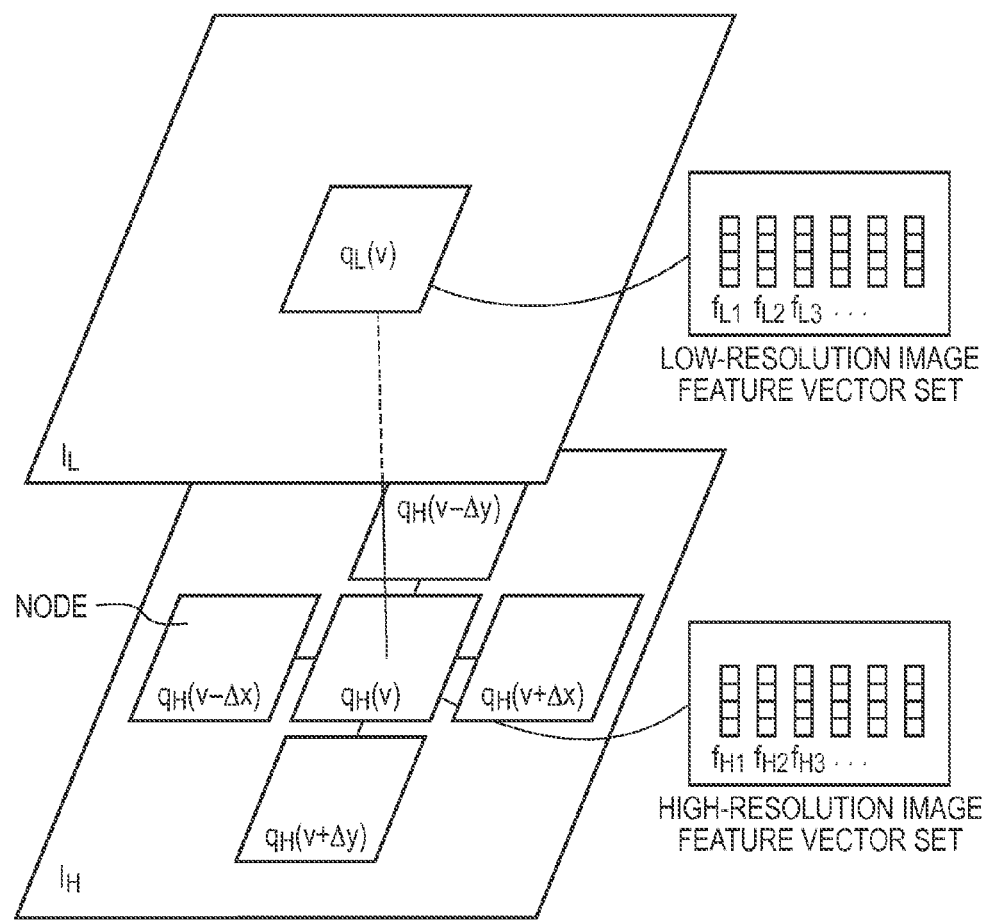

IMAGE PROCESSING APPARATUS, METHOD THEREOF, PROGRAM, AND IMAGE CAPTURING APPARATUS

BACKGROUND OF THE INVENTION

1. Field of the Invention

The present invention relates to an image processing technique and, more particularly, to a technique of improving the quality of an input image by image correction.

2. Description of the Related Art

In recent years, low-end digital video devices represented by a camera phone have become popular, and users can easily capture and use an enormous number of images. Accordingly, there is a demand for a software method for improving image quality mainly for the purpose of appreciation by increasing the resolution of a low-quality image or correcting a failure image such as a blurred image or the like.

In a known image correction method, for example, conversion dictionaries including feature amounts of low-quality images and those of high-quality images are learned and stored in advance to convert a low-quality image into a corresponding high-quality image (see S. Baker and T. Kanade, "Hallucinating faces", in IEEE International Conference on Automatic Face and Gesture Recognition, March 2000 (to be referred to as Baker et al. hereinafter)).

An image database that stores an enormous number of images is available recently. Hence, there is proposed a method for complementing an image using a similar image selected from the large number of images. For example, James Hays and Alexei A. Efros, "Scene Completion Using Millions of Photographs", ACM Transactions on Graphics (SIGGRAPH 2007), August 2007, vol. 26, No. 3 (to be referred to as James et al. hereinafter) describes image correction like patchwork that replaces a region of an input image with a region of another similar image.

The above-described methods are problematic in the following points. The method described in Baker et al. aims at a front face image having normalized size and direction. In this method, a conversion dictionary is stored for each partial region of a face, and image conversion is performed on the position basis. For this reason, it is possible to accurately reconstruct the face image even from a low-quality image in which the shapes of details such as the eye and the mouth are not distinct. However, to apply the method of Baker et al. to a general object in a natural image, it is necessary to correctly cut out the target object from the random background and completely adjust its size and direction for alignment. Such processing is generally hard to execute. Normalizing an articulated object such as a person or an animal that can pose with flexibility is more difficult. It is therefore hard to apply the position-based image correction like the method of Baker et al. to a general object in a free orientation.

In the method of James et al., basically, the original structure of a region is not stored. That is, according to the method of James et al., when a region of an input image is replaced with a region of another similar image, the structure of the input image may be lost, resulting in an image having no correlation between the regions.

SUMMARY OF THE INVENTION

The present invention has been made in consideration of the above-described problems, and aims to provide a technique of performing position-based image correction without losing the structure of an input image.

According to one aspect of the present invention, an image processing apparatus includes: a model storage unit adapted to store model information representing a subject model belonging to a specific category; a detection unit adapted to detect the subject from an input image by referring to the model information; a determination unit adapted to determine a region for which an image correction is to be performed within a region occupied by the detected subject in the input image; a correction data set storage unit adapted to store, for a local region of the image, a plurality of correction data sets representing correspondence between a feature vector representing a feature before correction and a feature vector representing a feature after correction; a selection unit adapted to select, from the correction data set storage unit, at least one of the correction data sets to be used to correct a local region included in the region determined to undergo the image correction; and a correction unit adapted to correct the region determined to undergo the image correction using the selected correction data sets.

According to another aspect of the present invention, an image processing method of an image processing apparatus including a model storage unit adapted to store model information representing a subject model belonging to a specific category, and a correction data set storage unit adapted to store, for a local region of the image, a plurality of correction data sets representing correspondence between a feature vector representing a feature before correction and a feature vector representing a feature after correction, the method includes: detecting the subject from an input image by referring to the model information; determining a region for which an image correction is to be performed within a region occupied by the detected subject in the input image; selecting, from the correction data set storage unit, at least one of the correction data sets to be used to correct a local region included the region determined to undergo the image correction; and correcting the region determined to undergo the image correction using the selected correction data sets.

Further features of the present invention will become apparent from the following description of exemplary embodiments (with reference to the attached drawings).

BRIEF DESCRIPTION OF THE DRAWINGS

FIG. 12 is a flowchart showing the procedure of creating correction data sets for a region between parts of an object;

FIG. 14 is a view showing the structure of a Markov network for image correction;

DESCRIPTION OF THE EMBODIMENTS

An embodiment of the present invention will now be described in detail with reference to the accompanying drawings.

(Image Processing Apparatus)

Figure 1:
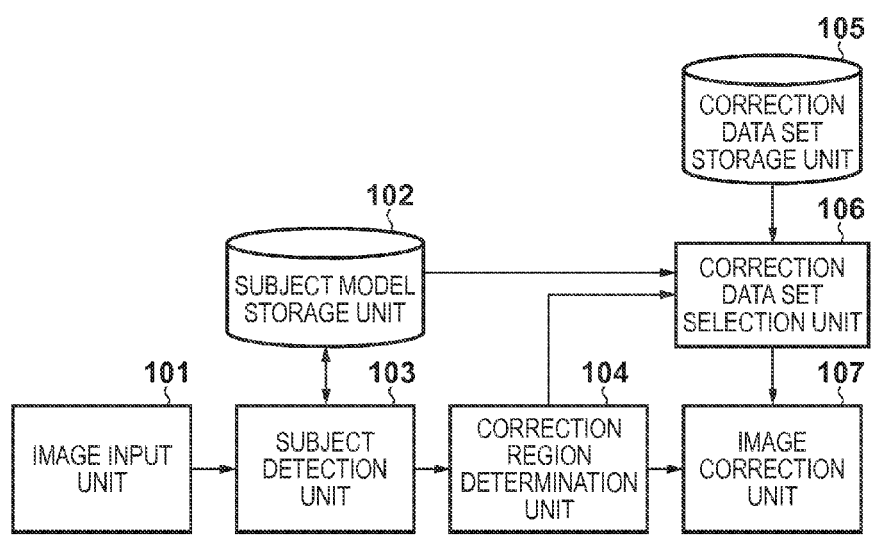
FIG. 1 is a block diagram showing an image processing apparatus according to an embodiment.

FIG. 1 is a block diagram showing the functional arrangement of an image processing apparatus according to an embodiment of the present invention. As shown in FIG. 1, the image processing apparatus includes the following components.

Image input unit 101: inputs an image.

Subject model storage unit 102: stores model data (model information) of subjects of a plurality of categories to detect a subject.

Subject detection unit 103: identifies a subject in an image.

Correction region determination unit 104: determines based on the state of a subject or an image whether to perform correction.

Correction data set storage unit 105: stores, for local regions of an image, a plurality of correction data sets representing the correspondence between feature vectors representing features before correction and feature vectors representing features after correction.

Correction data set selection unit 106: selects an appropriate correction data set in accordance with a subject or its region.

Image correction unit 107: corrects a correction region using a selected correction data set.

Details of each component will be described later.

Figure 21:
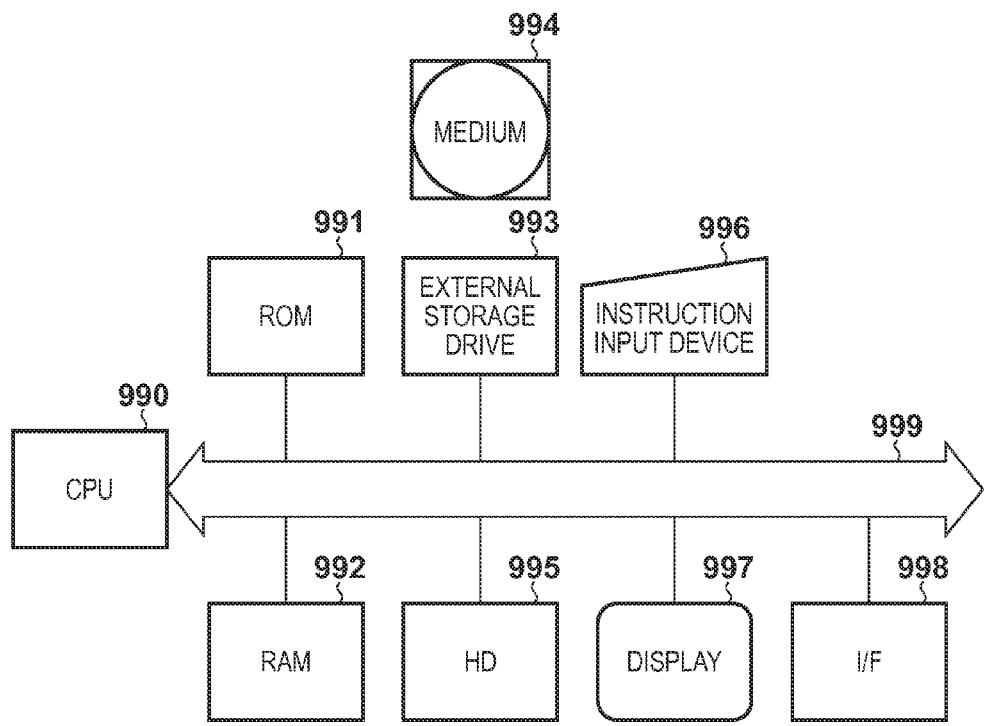
FIG. 21 is a block diagram schematically showing an example of the hardware configuration of the image processing apparatus.

FIG. 21 is a block diagram schematically showing an example of the hardware configuration of the image processing apparatus according to this embodiment. The image processing apparatus of this embodiment is implemented by, for example, a personal computer (PC), a workstation (WS), a mobile terminal, or a smart phone.

Referring to FIG. 21, a CPU 990 is a central processing unit that controls the operation of the entire image processing apparatus in cooperation with other constituent elements based on the operating system (OS) or an application program. A ROM 991 is a read only memory that stores programs such as the basic I/O program and data to be used in basic processing. A RAM 992 is a writable memory that functions as the work area of the CPU 990 and the like.

An external storage drive 993 implements access to a recording medium and can load a program and the like stored in a medium (recording medium) 994 to the system. Examples of the medium 994 are a flexible disk (FD), a CD-ROM, a DVD, a USB memory, and a flash memory. An external storage device 995 functions as a mass memory. In this embodiment, a hard disk drive (to be referred to as an HD hereinafter) is used. The HD 995 stores the OS, application programs, and the like.

An instruction input device 996 is a device that accepts input of an instruction or a command from the user. This corresponds to a touch panel, a keyboard, a pointing device, or the like. A display 997 is a display device that displays a command input from the instruction input device 996 or an output of the image processing apparatus in response to it. An interface (I/F) 998 is a device that relays data exchange to/from an external apparatus. A system bus 999 serves as a data bus that controls the data flow in the image processing apparatus.

As an alternative to the hardware apparatus, the invention can be implemented by software that implements the same functions as those of the above-described devices.

(Overall Processing)

A natural image mainly includes two types of subjects: an object such as a human body or a car having something in common regarding the general shape or parts of the subject and a background region including the sky or a mountain in indefinite shape. When, for example, increasing the resolution of an image for the purpose of appreciation, the appreciator readily feels awkward in the former subject if the structures of the eyes, the nose, and the like of a face have no consistency. For the latter subject, however, the appreciator psychologically feels less uncomfortable even if a region shape or the detailed structure of a texture has changed to some extent. In this embodiment, the resolution of an image is increased while distinguishing between the background and objects considering such characteristics of the natural image. The procedure of increasing the resolution will be described with reference to FIG. 2 that shows the outline of the procedure of this embodiment and FIG. 3 that shows an example of the function and result of each portion of this embodiment.

Figure 2:
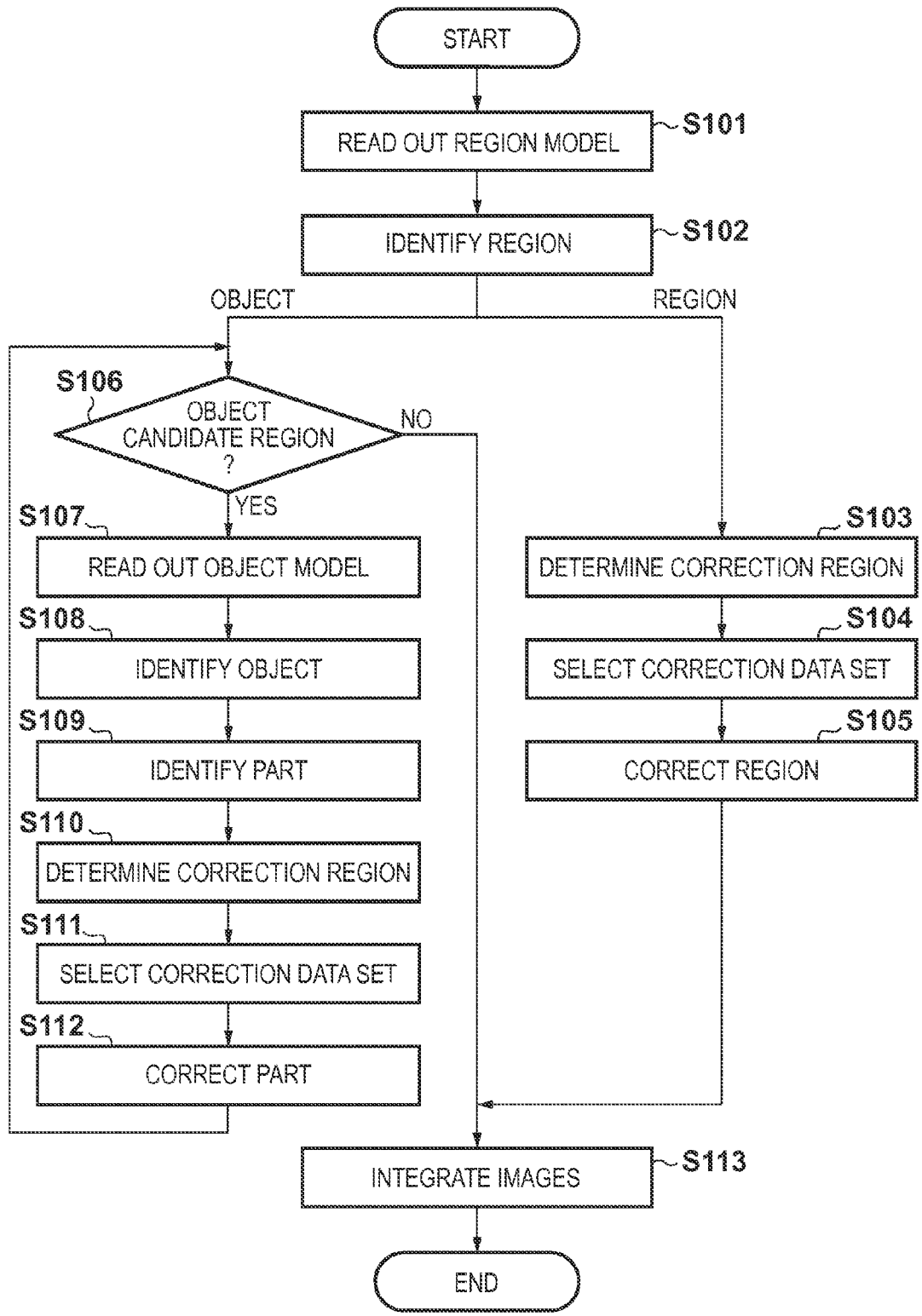
FIG. 2 is a flowchart showing the outline of the procedure of the image processing apparatus.
Figure 3:
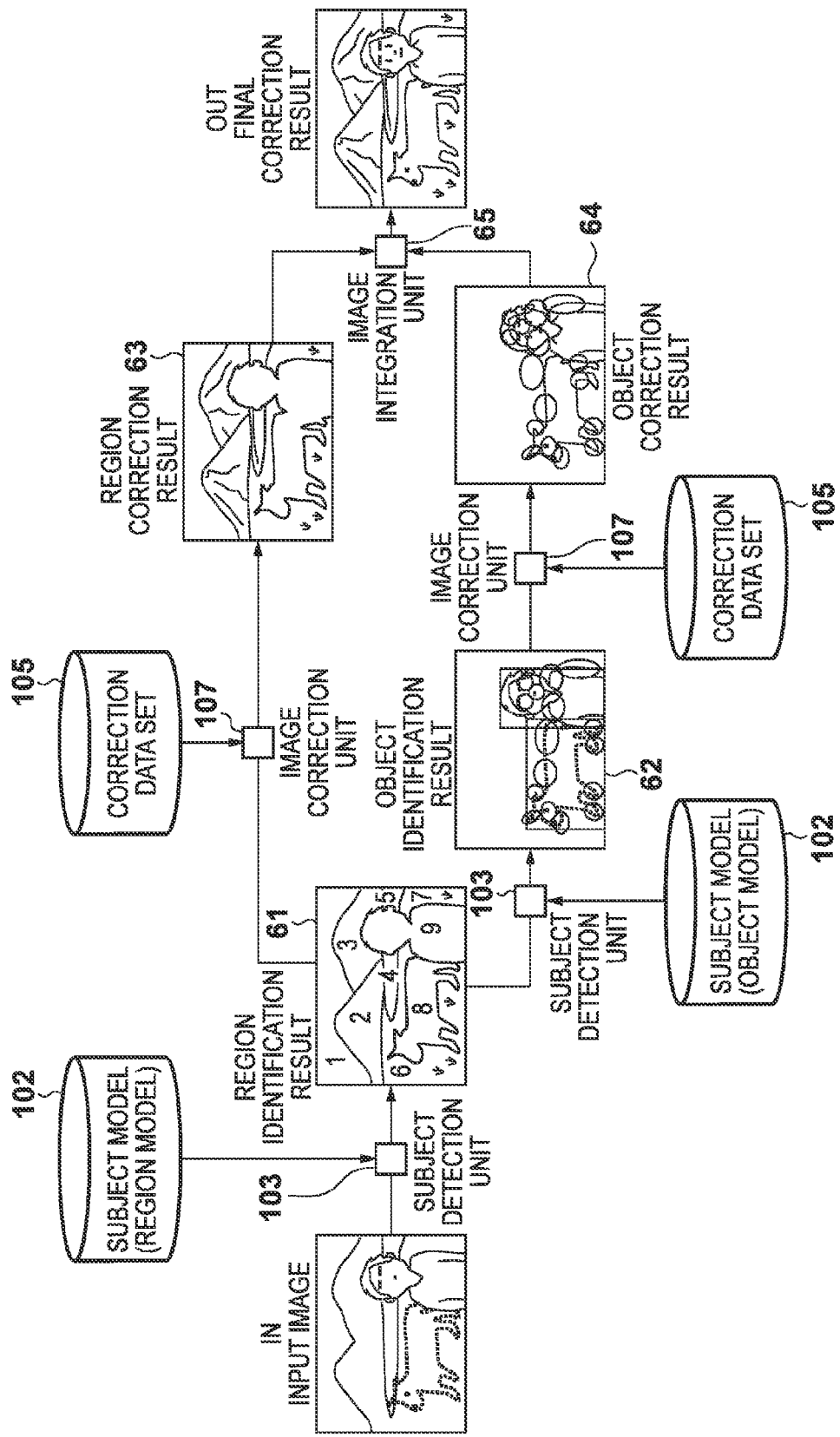
FIG. 3 is a view showing the result of each stage of image processing.

Referring to FIG. 2, the image processing apparatus according to this embodiment first reads out models concerning background regions from the subject model storage unit 102 (S101), and causes the subject detection unit 103 to identify the categories of regions included in the image (S102). The region identification result is presented as, for example, 61 in FIG. 3. For the background regions, processing of steps S103 to S105 is performed. For the object candidate regions, processing of steps S106 to S112 is performed.

Regarding the background regions, the correction region determination unit 104 determines the target correction region (S103). The correction data set selection unit 106 selects one or more corresponding correction data sets from a correction data set group that has been learned for each region and stored in the correction data set storage unit 105 in advance (S104). The image correction unit 107 performs image correction for each region (S105). The background regions after correction are presented as, for example, 63 in FIG. 3.

On the other hand, if a candidate region including an object exists (S106), a corresponding object model is read out from the subject model storage unit 102 (S107). Using the readout object model, the subject detection unit 103 detects the target object and identifies its position (S108). The object identification result is presented as, for example, 62 in FIG. 3. Next, the position and orientation of each part of an object are identified (S109). The correction region determination unit 104 determines a region to be corrected in the region of a part whose position and orientation are identified (S110). The correction data set selection unit 106 selects one or more corresponding data sets from a correction data set group that has been learned for each part of an object and stored in the correction data set storage unit 105 in advance (S111). The image correction unit 107 performs image correction for each part region of each object (S112). The objects after correction are presented as, for example, 64 in FIG. 3.

Finally, an image integration unit 65 of the image correction unit 107 composites the correction result of the background regions and that of the object regions, thereby obtaining an image corrected to a higher resolution (S113).

The above-described processing is executed under the control of the CPU 990 described above. The outline of the function of each unit and details of the processing procedure to implement the above-described function will be described below.

(Image Input)

The image input unit 101 is a module that inputs an image. The input image can be either a still image or a moving image. The image input unit can be, for example, an image sensor that captures an image or a device that reads out an image from an image database. Not only image information but also image attributes such as GPS information of the place of image capturing and the time stamp representing the shooting time may be input simultaneously and used in image processing of the subsequent stage to be described later. When the image input unit 101 is the device that reads out data from the image database, the label information of the subject may be associated automatically or manually on the image database and input as additional information.

(Subject Model)

The subject model storage unit 102 stores subject models to be used to detect a subject of a specific category from an image. Using the subject model, the subject detection unit 103 of the subsequent stage detects a subject of the target category from the image and identifies its position. There are two types of subject models: a model of a region that mainly uses the distribution of feature amounts in the region as the key for detection, and a model of an object that mainly uses the shape or structure of the object as the key for detection. In this embodiment, the former will be referred to as a region model, and the latter as an object model. The process of identifying a region model from an input image and details of an object model will be described below.

Region Model Identification

Figure 4:
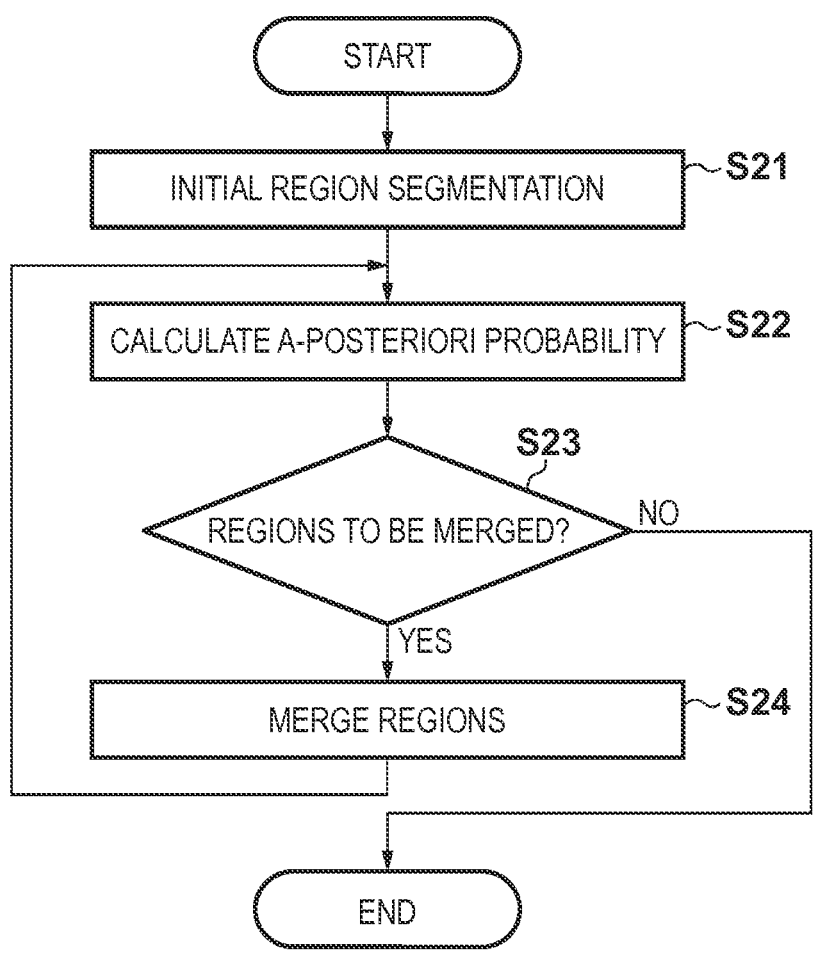
FIG. 4 is a flowchart showing the procedure of identifying a region of a subject.

The process of identifying a region model will be described first. This process is executed in step S102 of FIG. 2. A region model represents the region feature of a subject to recognize the category of a region mainly concerning the background, such as a mountain or the sky. In this embodiment, region model identification is implemented by the following method used for region segmentation in conventional scene analysis. The procedure of identifying a region category will be explained with reference to FIG. 4.

(1) Initial region segmentation (S21): For an input image, GIST (see A. Oliva and A. Torralba, "Modeling the shape of the scene: a holistic representation of the spatial envelope", Int. Journal of Computer Vision, 42(3):145.175, 2001) that is a feature amount expressing a local spatial frequency and Textons (see B. Julesz, "Textons, the elements of texture perception, and their interactions", Nature, 290(5802): 91.97., 1981) that is a kind of filter bank are obtained. These feature amounts undergo dimension reduction by a transformation matrix obtained in advance by principal component analysis or the like to obtain an n-dimensional feature vector. The n-dimensional feature of the spatial frequency, three-dimensional color information obtained by converting the pixels into a CIE L*a*b* color space, and two-dimensional position information (x,y) are added to obtain (n+5)-dimensional feature vector. The feature vectors of the pixels are classified into k clusters by k-means, and each cluster is defined as an initial region group. A predetermined number is defined as k. Note that as the spatial frequency feature, any other known feature amount such as Gabor Jet may be used.

(2) A-posteriori Probability Calculation (S22): For each of the k regions (clusters), an a-posteriori probability $P(C_i|X_k)$ that a distribution $X_k(\omega_{Col},\omega_{App})$ of the color feature amount and the spatial frequency feature amount belongs to a region category $C_i$ is obtained, where $\omega_{Col}$ is the feature vector of the color information, and $\omega_{App}$ is the feature vector of the spatial frequency. The distribution $X_k(\omega_{Col},\omega_{App})$ is normalized by setting, equally dividing, and discretizing an appropriate finite section so that the sum of distributions becomes 1 ($\Sigma\Sigma X_k(\omega_{Col},\omega_{App})=1$). From the Bayes rule, $$P(C_i|X_k) \propto P(X_k|C_i)P(C_i) \quad \text{[Mathematical 1]}$$

An a-priori probability $P(C_i)$ is given by the ratio of the total area of regions of each category to the entire image using learning image data labeled a region category in advance. Using the chi-square distance between a feature amount distribution $X_i(\omega_{Col},\omega_{App})$ of a category i and the feature amount distribution $X_k(\omega_{Col},\omega_{App})$ of a region k, a likelihood $P(X_k|C_i)$ is defined, for example, by $$P(X_k|C_i) := \frac{1}{Z}\exp\left\{-\frac{1}{\beta}\sum_{\omega_{Col}}\sum_{\omega_{App}}\frac{(X_i(\omega_{Col},\omega_{App}) - X_k(\omega_{Col},\omega_{App}))^2}{X_i(\omega_{Col},\omega_{App}) + X_k(\omega_{Col},\omega_{App})}\right\}. \quad \text{[Mathematical 2]}$$

where Z and $\beta$ are adjustment parameters. A feature amount distribution $X_i(\omega)$ of the category i is calculated from the learning image data in advance.

(3) Region Merge (S23 and S24): let MAX $P(C_i|X_k)$ be the maximum value of the a-posteriori probability that each region k belongs to each region category i. For a new region k' formed by merging the region k with the region closest to the region k, the maximum value is obtained in a similar manner as MAX $P(C_i|X_{k'})$. If MAX $P(C_i|X_{k'})$ is larger than the MAX $P(C_i|X_k)$ by a predetermined threshold or more, the region k is merged with the region closest to the region k. This processing is repeated until no region to be merged remains any more.

Each region category of the input image can be identified in the above-described way. Note that at this time, not the maximum value of the a-posteriori probability but an information amount given by $$H(P) = -\sum_i P(C_i|X_k)\log P(C_i|X_k) \quad \text{[Mathematical 3]}$$

may be used, and it may be judged whether the information amount increases to a predetermined threshold or more by region merge.

The region category identification may be done not to obtain a single result but to output a plurality of candidates.

Superordinate categories of the a-posteriori probability may be stored as a plurality of candidates. Then, image correction may be done based on a plurality of combinations, and the most appropriate result may be output, as will be described later. Alternatively, the processing may be used to present a plurality of results and cause the user to select one of them, as will be described later.

The above-described region segmentation method is a bottom-up region category estimation method based on local image feature amounts. However, in, for example, a low-resolution image, it may be impossible to uniquely identify a region category only within the local range. For this reason, this method may be used in combination with a method of identifying a category using the position of each region category on the image and the relative layout relationship or co-occurrence probability between the regions, that is, the context of an image.

An example of the method using the context of an image is a known method of estimating an image region based on the conditional probability field. A method of estimating a region using a pre-distribution of a region on an image or the adjacent relationship between regions is described in J. Shotton, J. Winn, C. Rother, and A. Criminisi, "Texton Boost for Image Understanding: Multi-Class Object Recognition and Segmentation by Jointly Modeling Texture, Layout, and Context", International Journal of Computer Vision, Vol. 81, No. 1 (1 Jan. 2009), pp. 2-23. In another known method, for example, a plurality of images whose compositions are similar to that of an input image are selected from an image database, and a region category is identified based on associated information (see, for example, C. Liu, J. Yuen, and A. Torralba, "Nonparametric scene parsing: Label transfer via dense scene alignment", Proc. of the IEEE Conference on Computer Vision and Pattern Recognition, 2009 (to be referred to as Liu et al. hereinafter)).

Object Model

The object model will be described next. The object model is a model for a human body or an animal such as a dog, or an artifact such as a car or a bicycle. In general, objects of the same category include subordinate components having similar shapes and similar layout relationships. The object model can be a model that expresses such an object structure. In addition, since one of the main effects of this embodiment is to correct a low-quality image to a high-quality image, the object model can be a model expression capable of robustly detecting even a dirty target containing a blur or noise.

In this embodiment, the image correction unit 107 of the subsequent stage executes image correction using the parts correspondence between the object model and the detected object so as not to lose the structural consistency. For this reason, the object model used in this embodiment can be a model including the expression of the coarse position and orientation of an object. In this embodiment, a parts-based model technique is used as the object model.

A part indicates a subordinate structure included in an object. Especially, a part indicates a structural unit that changes its appearance as the individual, orientation, or pose of an object changes. A part can be either a constituent unit segmented as a significant portion such as "hand" or "leg" viewed from the human, or a constituent unit segmented using a statistical standard as in, for example, B. Epshtein and S. Ullman, "Feature hierarchies for object classification", Proc. IEEE Int. Conf. Comput. Vis. 1, 220.227, 2005 or R. Fergus, P. Perona, and A. Zisserman, "Object Class Recognition by Unsupervised Scale-Invariant Learning", Proceedings of the IEEE CVPR 2003 (to be referred to as Fergus et al. hereinafter). Examples of the known parts-based method are a constellation model (see, for example, Fergus et al.) and a deformable part model using an HOG (Histograms of Oriented Gradients) feature amount (see P. Felzenszwalb, D. McAllester, and D. Ramanan, "A Discriminatively Trained, Multiscale, Deformable Part Model", Proceedings of the IEEE CVPR 2008 (to be referred to as Felzenszwalb et al. hereinafter)).

Note that the object model of this embodiment need not always be embodied by a parts-based model. For example, a method based on deformable template matching (see, for example, A. C. Berg, T. L. Berg, and J. Malik, "Shape Matching and Object Recognition using Low Distortion Correspondences", Proceedings of the 2005 IEEE Computer Society Conference on Computer Vision and Pattern Recognition, 2005) can also obtain the local parts correspondence between a model and an object. Also usable is, for example, a method such as a so-called convolutional neural network (see, for example, M. Matsugu, K. Mori, M. Ishii and Y. Mitarai, "Convolutional spiking neural network model for robust face detection", Proceedings of the Ninth International Conference on Neural Information Processing, 2002) that is a multilayered pattern recognition method. In the convolutional neural network method, the intermediate pattern of an object is formed in the neuron of the intermediate layer. The coarse position of the intermediate pattern is obtained by back projection of the activity of the neuron of the output layer, thereby obtaining the parts correspondence between a model and an object. Some of such methods that are not explicitly based on parts are also applicable to the embodiment as the object model.

Since the above-described various object model methods are sufficiently disclosed in the literatures and can be practiced by those skilled in the art, a detailed description of the individual methods will be omitted here. In this embodiment, the constellation model that is one of the parts-based model methods is used as the object model.

The constellation model expresses a probability distribution that represents the existence of a given part of an object on a two-dimensional image with respect to the reference position of the object using parameters such as the outer appearance, relative position, rotation angle, and size. A problem common to the constellation model and other parts-based models is the difficulty in covering all free orientations of a three-dimensional object. The appearance of an object changes depending on the direction in which the observer observes the object. The appearance of an articulated object changes also by the orientation. The part model often limits the target to a viewpoint or orientation in a narrow range and learns the distribution by parametric approximation only in that range.

Figure 5:
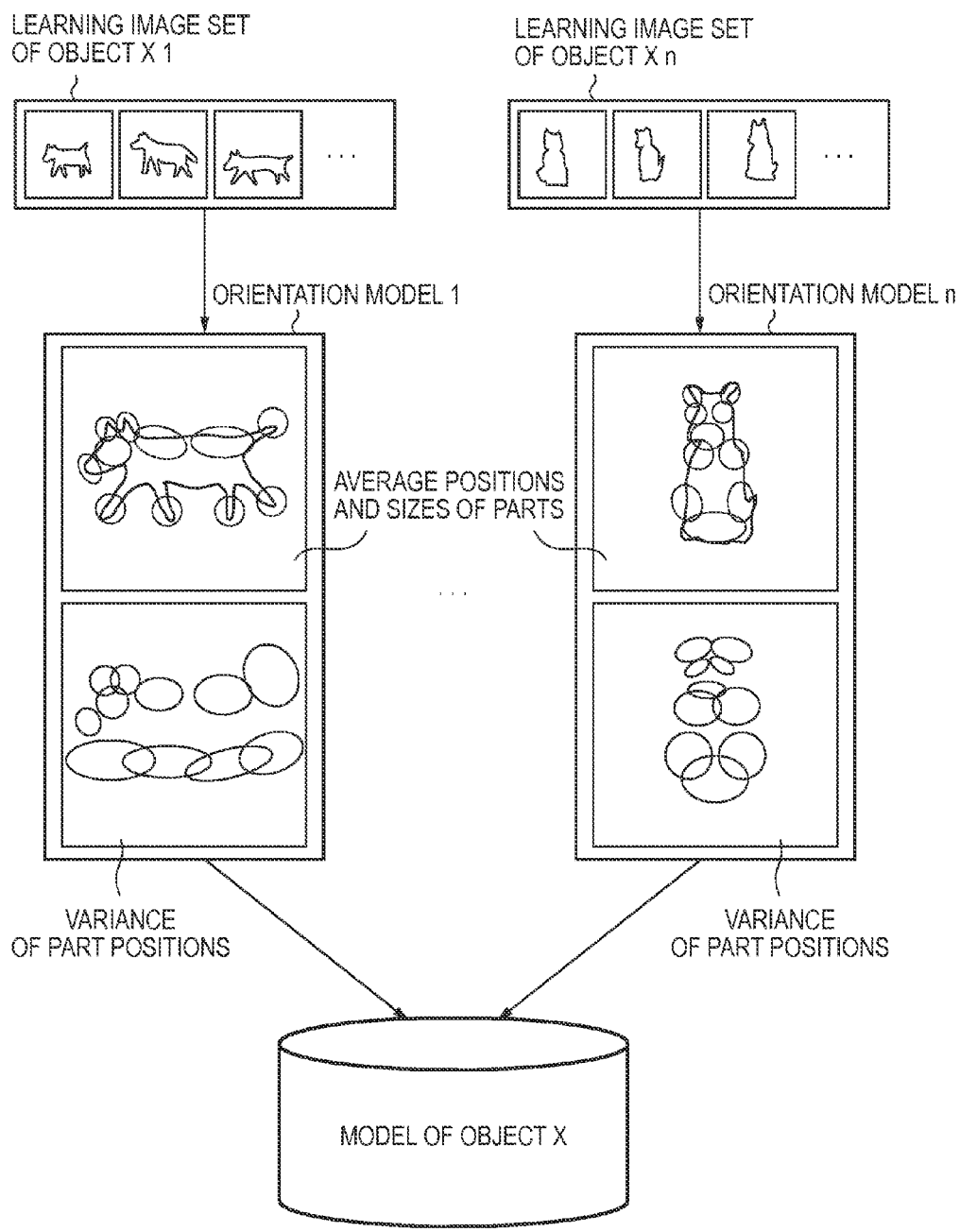
FIG. 5 is a view showing object models and subcategories of orientations.

This embodiment aims to perform image correction by identifying even an object that takes various orientations. In this embodiment, a plurality of object models are created and stored for one object category in accordance with the observation direction and orientation, thereby coping with the variety of orientations. An example of the embodying method will be described. For example, as shown in FIG. 5, learning image data are classified in advance into groups of images by a similar viewpoint or orientation of an object, and models are generated and stored for each orientation. The thus generated model subcategories will be referred to as orientation subcategories. In FIG. 5, out of the parameters of generated part models, the average position and size and the position variance of each part are indicated by ellipses.

Note that even when a deformable part model like that of Felzenszwalb et al. is used as the object model in place of the constellation model, a plurality of models are similarly generated and stored in accordance with the observation direction and the orientation.

The object categories include categories having a variety of shapes. For example, a "car" category includes many variations of shapes such as "truck" and "sports car". In this case, it may be impossible to obtain sufficient detection performance by only one object model. To cope with this, subcategories can be created by classifying objects in similar appearance into groups, and a model can be created and stored for each subcategory. The thus generated subcategories will be referred to as shape subcategories.

Note that the subject model storage unit 102 selects and stores the object model groups of the categories and subcategories of the image correction target in consideration of the storage capacity and the calculation time required for detection. That is, model information is stored for each subcategory representing a specific classification of a category.

(Subject Detection)

The subject detection unit 103 detects and identifies the subject using the above-described subject model (the region model and the object model). In this embodiment, as the model to identify the region category, the above-described region segmentation method is used. As the object model, the above-described constellation model is used. The region segmentation method can be used as the region model of this embodiment because it can identify the region category and determine the boundary between the regions. The constellation model can be used as the object model of this embodiment because it can express an articulated object and determine the position of each part of the object at the same time as recognition.

Figure 6:
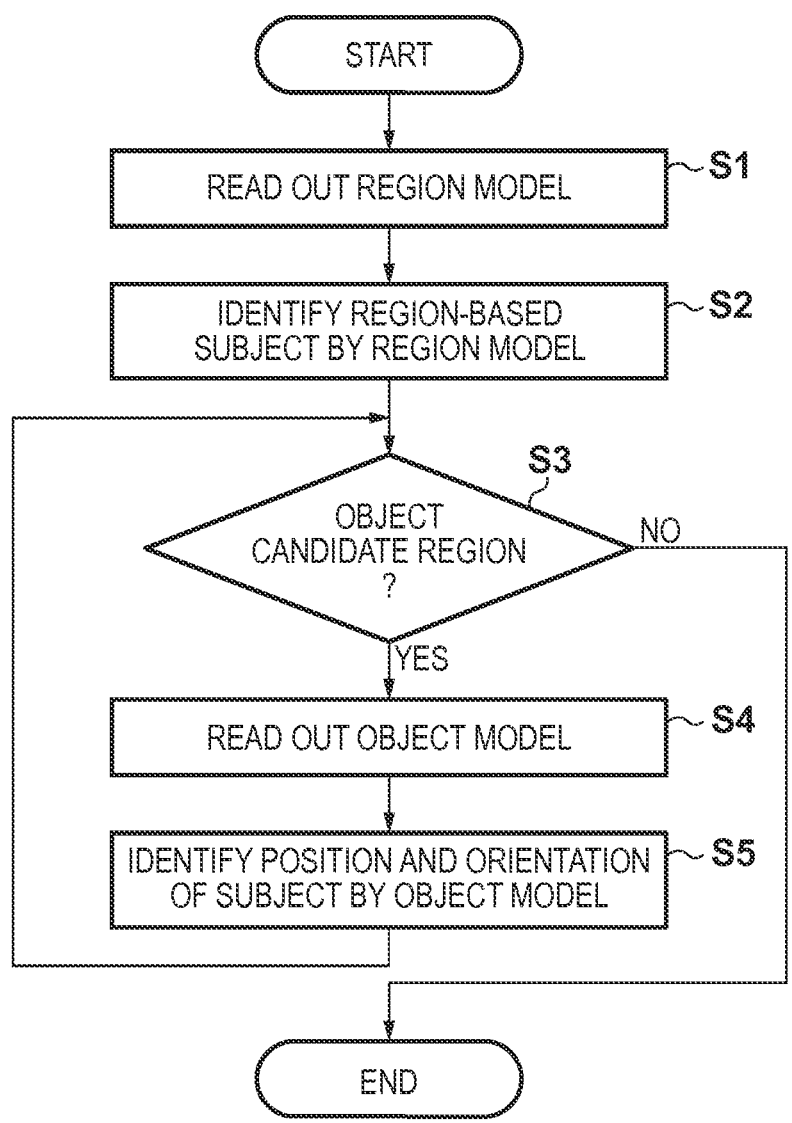
FIG. 6 is a flowchart showing the procedure of identifying a subject by a subject model.

The subject detection procedure will be explained with reference to FIG. 6. This processing is executed in steps S101, S102, and S106 to S108 of FIG. 2.

(1) All region models are read out from the subject model storage unit 102 (a storage device such as the HD 995) (S1). Note that the region model categories include the candidate regions of objects such as a human body and a dog.

(2) Region segmentation and integration are performed by the above-described method to identify the subject category for each region (S2).

(3) If an object region exists in the identified regions, the object region is stored (S3). Note that a region whose maximum value of the probability that the region belongs to any one of the categories is smaller than a predetermined threshold may be defined as an unknown region, and included in the object candidate regions.

(4) If an object candidate region exists, object models are read out from the subject model storage unit 102 (S4). The object models are formed from an object model group including at least one orientation subcategory and at least one shape subcategory.

(5) Calculation is performed using all of the plurality of object models read out in step S4 so as to determine whether one of them matches the object candidate region. If there is an object model that matches in a predetermined value or more, it is determined that an object model is detected. The category of the object model and the parameters such as the position and orientation are output to the correction region determination unit 104 of the subsequent stage (S5).

(6) Steps (2) to (5) are executed for all regions.

Note that in this case, in order to reduce the calculation amount, the object candidate regions are narrowed down using the region models, and the object is then detected using the corresponding object model. Hence, the object detection procedure is not always limited to this method.

Note that in case of, for example, the constellation model, the matching between the model and the object is calculated in step S5 as follows.

(1) A SIFT feature amount (see D. G. Lowe, "Object recognition from local scale-invariant features", Proceedings of the International Conference on Computer Vision 2: 1150-1157, 1999) is detected from the object candidate region, or feature points are detected using a Harris Affine (see K. Mikolajczyk, T. Tuytelaars, C. Schmid, A. Zisserman, J. Matas, F. Schaffalitzky, T. Kadir and L. Van Gool, "A comparison of affine region detectors", In IJCV 65(1/2):43-72, 2005) detector, and all feature points are set as the part candidates of the object.

(2) n part candidates are selected, and likelihoods representing whether a part matches the object model are calculated for all combinations and added. The likelihood calculation is done based on Bayes estimation using the probability distribution of the outer appearance, relative position, rotation angle, and size of each part.

(3) At the same time, likelihoods representing whether a combination of the above-described part candidates is included in the background are calculated and added. Based on whether the ratio of the two likelihoods is equal to or larger than a threshold, it is judged whether the object candidate equals the object of interest.

In this case, n is the number of parts included in the object model. For further details, see Fergus et al.

Note that when an HOG-based deformable part model (Felzenszwalb et al.) is used as the object model in step S5, the object detection/identification is done in the following way.

(1) Sliding window is performed in an object candidate region to calculate the score of matching to a first model expressing the general shape of the object.

(2) A part is detected using a part model in a window where the score is equal to or higher than a threshold. All regions where the score of matching of the part is equal to or higher than the threshold are selected as part candidates.

(3) If the scores of the part candidates and their spatial combination match the deformable part model in a predetermined threshold or more, the region is detected as an object. However, since the HOG-based model is not invariable in size, unlike the constellation model, detection needs to be done using a plurality of resolution images.

Note that if a region is excessively segmented in the region identification of step S2, an object may extend over a plurality of candidate regions. In addition, part of the object may be defined as an unknown region. For this reason, as another example of the embodiment, the feature point extraction of procedure (1) may be performed in all candidate regions in which the probability that the region is the object is equal to or higher than a predetermined threshold. As another example, to prevent undetection of the object, matching of the object model may be done in the entire image without determining a candidate region, although the calculation amount increases. Alternatively, object detection may be executed using all object models stored in the subject model storage unit 102, although the calculation amount further increases.

Note that the object detection accuracy can be increased by the same method as in the embodiment described above concerning the region model in which the adjacent relationship between the regions or the like is used as the context. For example, a box-shaped electrical appliance object located at a relatively high position of the screen near a cupboard is a microwave oven at a high probability. However, a box-shaped electrical appliance object located in the middle of the screen together with a sofa is probably a TV set. To use the context of the co-occurrence relationship or layout relationship between objects, for example, a method as described in S. K. Divvala, D. Hoiem, J. H. Hays, A. A. Efros, and M. Hebert, "An Empirical Study of Context in Object Detection", Proc. of the IEEE Conference on Computer Vision and Pattern Recognition, 2009 (to be referred to as Divvala et al. hereinafter) is used.

(Correction Region Determination)

The correction region determination unit 104 determines a region that is to be an image correction target out of the identified object regions. This processing is executed in step S110 of FIG. 2. The correction region determination can be done either automatically by a method to be described later or by providing the correction region determination unit with an instruction device (instruction input device 996) configured to make the user determine the region and causing the user to do the determination. When the instruction device is implemented by, for example, a touch panel also functioning as an image display device (display 997), the operation is easy. In this case, the user confirms an obtained image and inputs an instruction by touching a region to be subjected to image correction.

Alternatively, for example, the instruction device for determining a region may be a device that designates a specific object category or subcategory in advance. For example, the user may register family members or pets of his/her own in the subject model storage unit 102 as an object model subcategory in advance so that a subject of the registered subcategory out of an obtained image can preferentially undergo the image quality improvement.

As another method, for example, the image quality of a subject region may be evaluated. If the image quality is poor, the region is set as the correction region. To judge the image quality of a specific region of an input image, for example, the following method is used.

(1) Two-dimensional Fourier transform is performed for learning images that are high-quality images collected, thereby obtaining the power of the spatial frequency of each object region. This serves as a feature vector. For each region, the feature vector is extracted from all learning images, and the standard feature vector distribution of each region is stored.

(2) Two-dimensional Fourier transform is performed for an input image to obtain the power of the spatial frequency of each region as the feature vector. If the feature vector deviates from the standard distribution, the region is judged to be a low-quality image.

Note that when obtaining the power, the presence/absence of a blur in the subject can accurately be judged by executing the Fourier transform for only edges and regions near the edges.

With the above-described processing, the correction region determination unit 104 determines the correction region target region.

(Correction Data Set)

Data sets corresponding to the region categories and subcategories are prepared in the correction data set storage unit 105. The correction data set selection unit 106 reads out, from the correction data set storage unit 105, correction data corresponding to the target region determined by the correction region determination unit 104.

The contents and forming method of the correction data sets change depending on the contents of image correction to be performed by the image correction unit 107. In this embodiment, as an example of image correction to be performed by the image correction unit 107, an example in which a low-resolution image is converted into a high-resolution image will be described.

There are proposed a plurality of methods for constituting the data sets to be used to convert a low-resolution image into a high-resolution image. For example, in Baker et al. described in "Description of the Related Art", wavelet expansion is performed for a pair of a low-resolution image and a high-resolution image to create a pair of feature vectors, which is used as a conversion dictionary to convert the low-resolution image into the high-resolution image.

Alternatively, for example, in C. Liu, H. Shum, and C. Zhang, "A two-step approach to hallucinating faces: Global parametric model and local nonparametric model", in Proceedings of the IEEE Computer Society Conference on Computer Vision and Pattern Recognition, 2001, a low-resolution image is projected into an eigenspace to generate an intermediate-resolution image, and the intermediate-resolution image is then converted into a high-resolution image using a Markov probability field obtaining by learning the conversion dictionary.

As the characteristic feature of the arrangement according to this embodiment, the constituent parts of an object are identified using the object models, and image correction is performed while maintaining the structure. Hence, any method of performing correction based on a local region is usable. The two methods described above are usable as the image correction method of this embodiment. Also usable is a method of implementing conversion between a low-quality image feature and a high-quality image feature by belief propagation, as in W. T. Freeman, E. C. Pasztor, and O. T. Carmichael, "Learning Low-Level Vision", International Journal of Computer Vision 40(1), 25-47, 2000.

In this embodiment, multi-resolution images are used as image feature amounts. In this embodiment, the feature vectors of multi-resolution images are extracted from each of a high-quality image and a low-quality image, and the correspondence between the feature vectors is stored as a correction data set. Using the multi-resolution images enables to obtain the correspondence robustly against noise or deformation to some extent.

The correction data sets of this embodiment include the following three different types.

(A) Correction data sets for a background region
(B) Correction data sets for an object part region
(C) Correction data sets for an object non-part region The image correction unit 107 of the subsequent stage changes the image correction method in accordance with the three types of data sets. The correction data sets are classified into (A) to (C) because these regions have different characteristics, and information to be referred in image correction changes between them.

A part model such as the constellation model can identify the position and orientation of each part of an object. It is therefore possible to create correction data sets specialized to the position of the local region of each part. For example, defining an eye as a part, image correction is performed by creating a correction data set for the position of each local region such as a pupil or a lacrimal gland. Hence, high-quality image correction capable of reproducing even a detailed structure is possible. In addition, since the orientation is identified, the shape of each part can be normalized and adjusted. For this reason, image correction can be done without being affected by the appearance angle and orientation to some extent.

On the other hand, object regions other than the parts have unknown structures. However, a corresponding region on the model can be estimated at an accuracy to a degree based on the relative position to an identified neighboring part. When the correction data sets are created using the relative position information, image correction moderately depending on the position can be performed.

Finally, a background region has an indefinite shape, and therefore, no corresponding position can be obtained between the model and the subject. Hence, correction data sets independent of the position are created for image correction.

Based on the difference in the characteristic between the regions, the correction data sets are classified into (A) to (C), and each region is corrected using a different method. The results are composited later to attain optimum image correction as a whole. Methods of forming the correction data sets (A) to (C) will be explained below in detail.

(A) Creating Correction Data Sets for Background Region

Figure 7:
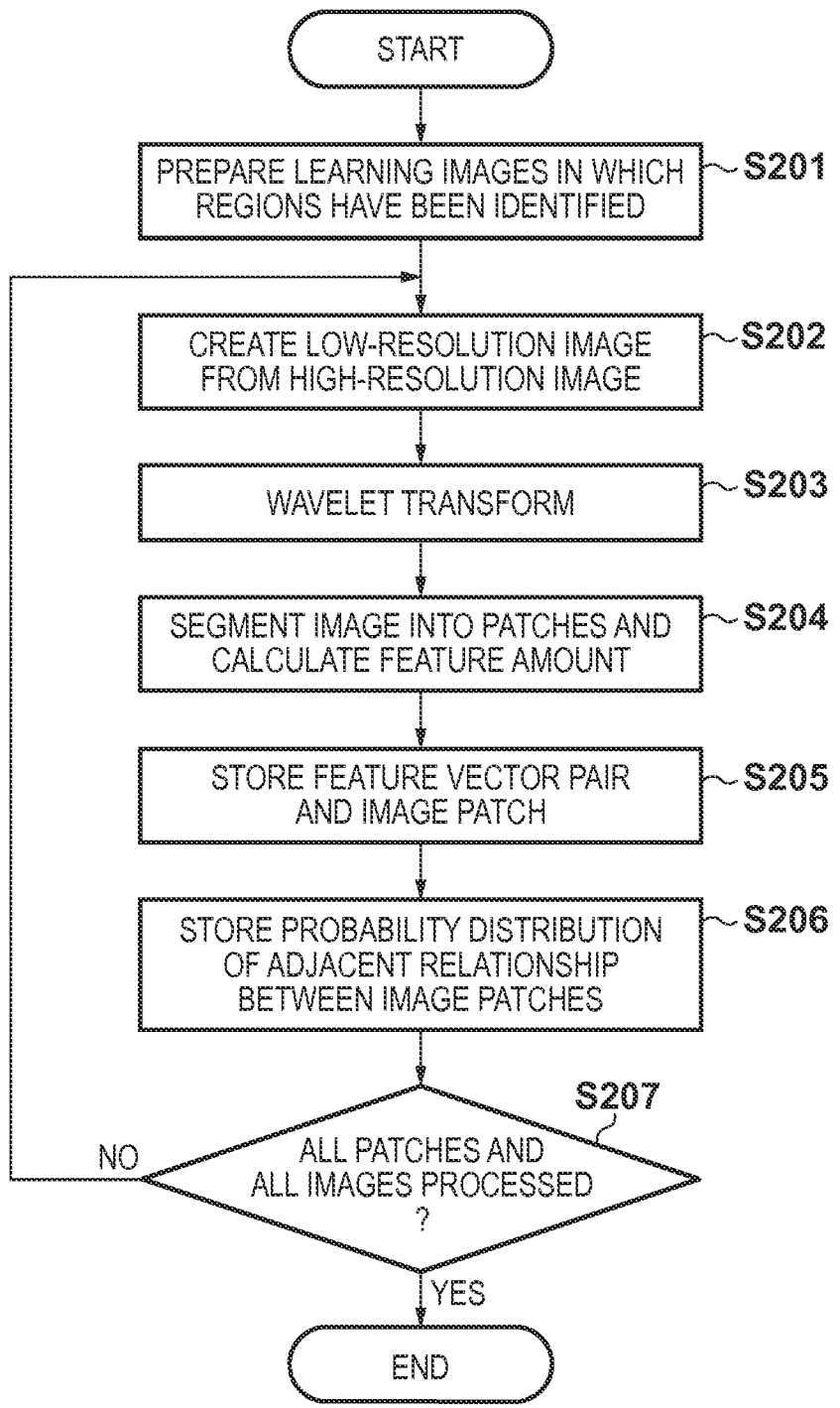
FIG. 7 is a flowchart showing the procedure of creating correction data sets for a background region.

A method of creating correction data sets for a background region will be described here. The data set for the background region mainly includes the following two elements. One is a conversion dictionary of a high-resolution image patch $I_H$ and a low-resolution image patch $I_L$. The conversion dictionary is learned independently of an image patch appearance position v. The other is an a-priori probability representing whether two arbitrary high-resolution image patches $I_{Hi}$ and $I_{Hj}$ are adjacent. The procedure will be described below with reference to FIG. 7.

(1) A set of high-resolution learning images including regions of a category c, in which background regions have been identified in advance, is prepared (S201).

(2) For a high-resolution learning image, down-sampling and subsampling are performed n times each, thereby creating low-resolution images having the same size as that of the learning image (S202).

Figure 8:
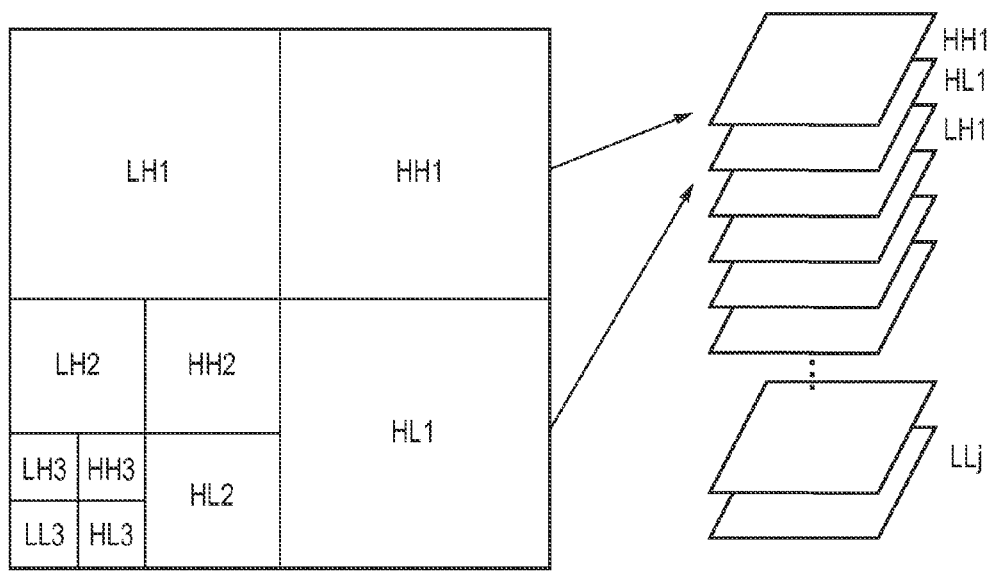
FIG. 8 is a view showing the structure of wavelet multi-resolution images.

(3) For each of the high-resolution images and the low-resolution images, binary discrete wavelet transform is performed j times to obtain (3j+1) wavelet multi-resolution images {$HH_1$, $HL_1$, $LH_1$, $HH_2$, $HL_2$, . . . , $LL_j$}, as shown in FIG. 8 (S203).

Figure 9:
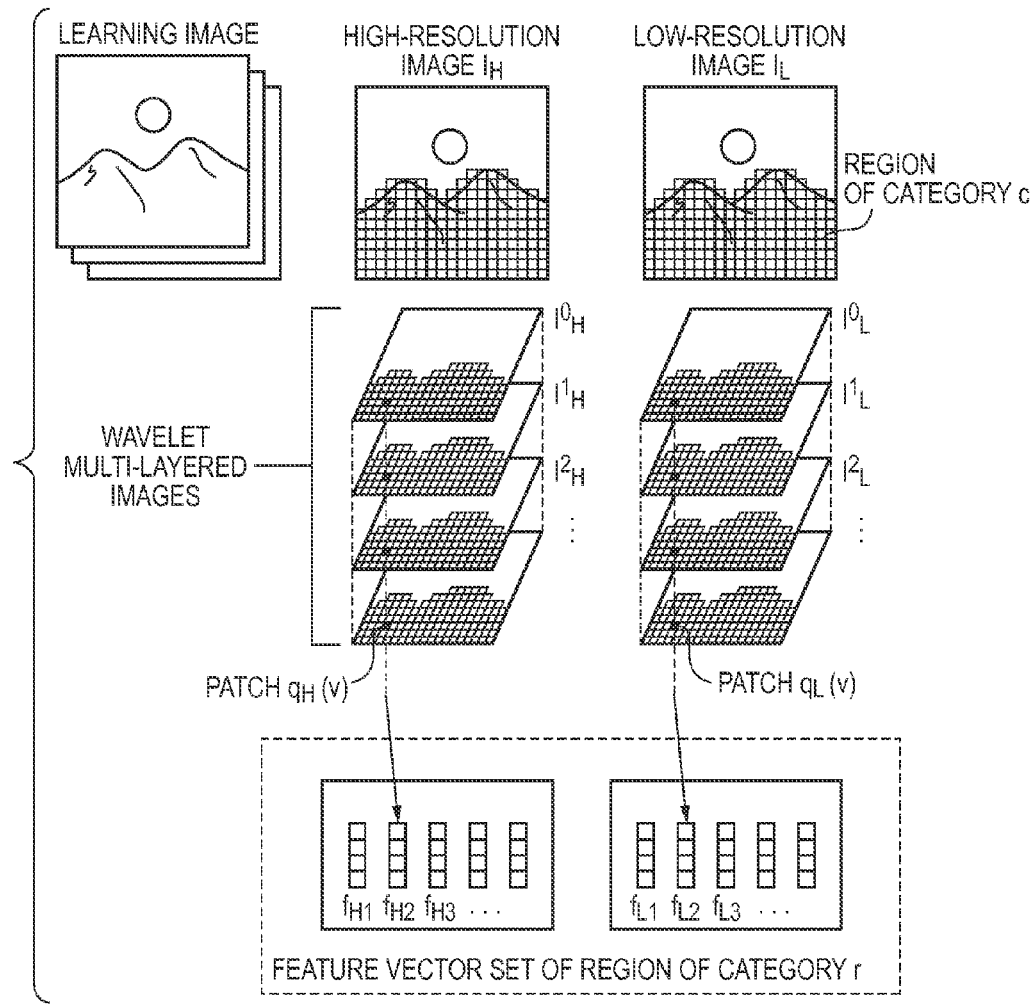
FIG. 9 is a view showing a method of creating correction data sets for a background region.

(4) As shown in FIG. 9, each image is segmented into image patches each having a size of $w_q \times h_q$. The pixel values of images patches $q^0(v)$, $q^1(v)$, . . . , $q^n(v)$ of different layers at the position v are put together and arranged for each of the high-resolution images and the low-resolution images, thereby creating feature vectors $f_H(v)$ and $f_L(v)$ (S204).

(5) The pairs of image feature vectors are stored. Independently of the patch position v, Pairs of image feature vectors $\{(f_{Hi}, f_{Li})|_{i=1,\ldots,n}\}$ and Patches $Q_H=\{q_{H1}, q_{H2}, \ldots, q_{Hn}\}$ and $Q_L=\{q_{L1}, q_{L2}, \ldots, q_{Ln}\}$ are stored together to create a conversion dictionary for correction (S205).

(6) The a-priori probability that the image patches $Q_H=\{q_{H1}, q_{H2}, \ldots, q_{Hn}\}$ of the high-resolution image appear adjacently is calculated and stored (S206).

(7) Steps (1) to (6) are performed for all learning images, and the results are combined to obtain the correction data of the region category c.

The down-sampling and subsampling of step S202 are performed in the following way.

$$F_{shrink}(I(x, y)) = \frac{1}{4}\sum_{\Delta x=0}^{1}\sum_{\Delta y=0}^{1} I(2 \times x + \Delta x, 2 \times y + \Delta y),$$
$$F_{expand}(I(x, y)) = I\left(\left\lfloor\frac{x}{2}\right\rfloor, \left\lfloor\frac{y}{2}\right\rfloor\right).$$

[Mathematical 4]

In this case, the down-sampling and subsampling are performed a predetermined number of times, that is, n times.

However, a plurality of low-resolution images may be prepared by changing the number of times of sampling, and a conversion dictionary may be created for each image.

The image feature vector f(v) of step S204 is calculated in the following way. Then, $w_q \times h_q$ pixel values of an image patch $q^i(v)$ at the position v of an image i out of the wavelet multi-resolution images are arranged in a line. The pixel values are concatenated and arranged for all the images from the 1st layer to the (3j+1)th layer to obtain an image feature vector. A vector having dimensions corresponding to a length $d=(3j+1)\times w_q\times h_q$, which is given by $$f(v) = \begin{pmatrix} q^1(v) \\ q^2(v) \\ \vdots \\ q^{3j+1}(v) \end{pmatrix}$$

[Mathematical 5]

is used as the image feature vector. A case of a monochrome image has been described above. For a color image, for example, each of the values of three dimensions L*, a*, and b* is used as a vector value, and a feature vector having dimensions corresponding to a length $d=3\times(3j+1)\times w_q\times h_q$ is used as the image feature vector f(v). If the size of the image patch is large, the vector becomes very high in dimension and harder to process. Hence, the dimensions may be reduced by performing principal component analysis in advance to decrease the calculation amount.

Concerning an image patch including a region of the boundary in the image patch set $Q_H$ stored in step S205, a mask image set $Q^m_H$ of binary images representing the graphic and background regions is also stored. The mask image set $Q^m_H$ is used to integrate the image correction results, as will be described later. Note that the graphic and background judgment is performed by judging and labeling the object region and the background region for each pixel by a known method such as graph cut upon identifying the object from the learning image (see, for example, the method of C. Rother, V. Kolmogorov, and A. Blake, "GrabCut—Interactive Foreground Extraction using Iterated Graph Cuts", in ACM Transactions on Graphics (SIGGRAPH), August 2004).

An a-priori probability representing whether an image patch $q_{Hi}$ and another image patch $q_{Hj}$ exist adjacent to one of four neighbors in step S206, which is given by $$p(q_H(v)=q_{Hi}, q_H(v+u)=q_{Hj}), (u \in N, N=\{+\Delta x, -\Delta x, +\Delta y, -\Delta y\})$$

[Mathematical 6]

is non-parametrically learned as follows. Note that N is a set representing the four-neighbor relationship, and u is the basis of N. First, n sets of adjacent image patches $q_H(v')$ and $q_H(v'+u)$ are extracted at random from all region categories c in the learning image. d-dimensional feature vectors $f_H(v')$ and $f_H(v'+u)$ corresponding to the image patches are concatenated to obtain a D-dimensional vector given by $$f^u = \begin{pmatrix} f_H(v') \\ f_H(v'+u) \end{pmatrix}$$

[Mathematical 7]

(D=2d). In this way, n vector sets $F^u=\{f^u_1, \ldots, f^u_n\}$ are created and stored. The sets are individually created for each of four neighbors. The a-priori probability that the two arbitrary image patches $q_{Hi}$ and $q_{Hj}$ are observed in the adjacent relationship u can be estimated by kernel density estimation as $$p(q_H(v) = q_{Hi}, q_H(v+u) = q_{Hj}) = \frac{1}{n}\sum_{m=1}^{n} k(f^{ij}, f_m^u) \quad \text{[Mathematical 8]}$$

where $f^{ij}$ is the vector obtained by concatenating $f_{Hi}$ and $f_{Hj}$ that are the feature vectors of $q_{Hi}$ and $q_{Hj}$, which is given by $$f^{ij} = \begin{pmatrix} f_{Hi} \\ f_{Hj} \end{pmatrix} \quad \text{[Mathematical 9]}$$

In addition, $k(x_1, x_2)$ is the Gaussian kernel which is defined using the square norm as $$k(x_1, x_2) = \frac{1}{(2\pi h^2)^{\frac{D}{2}}} \exp\left\{-\frac{\|\text{diag}(w) \cdot (x_1 - x_2)\|^2}{2h^2}\right\} \quad \text{[Mathematical 10]}$$

where w is the weighted vector that adjusts the distance between the dimensions of the feature vector, and h is the kernel scale parameter to which an appropriate value is given based on the data distribution.

In the above-described method, the probability density is hard to estimate when the feature vector is high-dimensional. In this case, for example, clustering may be performed to classify the image patch set $Q_H=\{q_{H1}, \ldots, q_{Hn}\}$ into k clusters $\Xi=\{\xi_1, \ldots, \xi_k\}$ for discretization, and the a-priori probability of the adjacent relationship between the image patches may be learned for each cluster. Note that the cluster classification is done using a known method such as k-means. Let $\xi = \Phi(q)$ be the function that associates a patch q with a cluster $\xi \in \Xi$. The a-priori probability of observing the two image patches $q_{Hi}$ and $q_{Hj}$ in the adjacent relationship u is appropriately defined as $$p(q_H(v)=q_{Hi}, q_H(v+u)=q_{Hj})=p(\Phi(q_H(v))=\Phi(q_{Hi}) \\ \Phi(q_H(v+u))=\Phi(q_{Hj})) \quad \text{[Mathematical 11]}$$

(B) Creating Correction Data Sets for Part Region of Object

Figure 10:
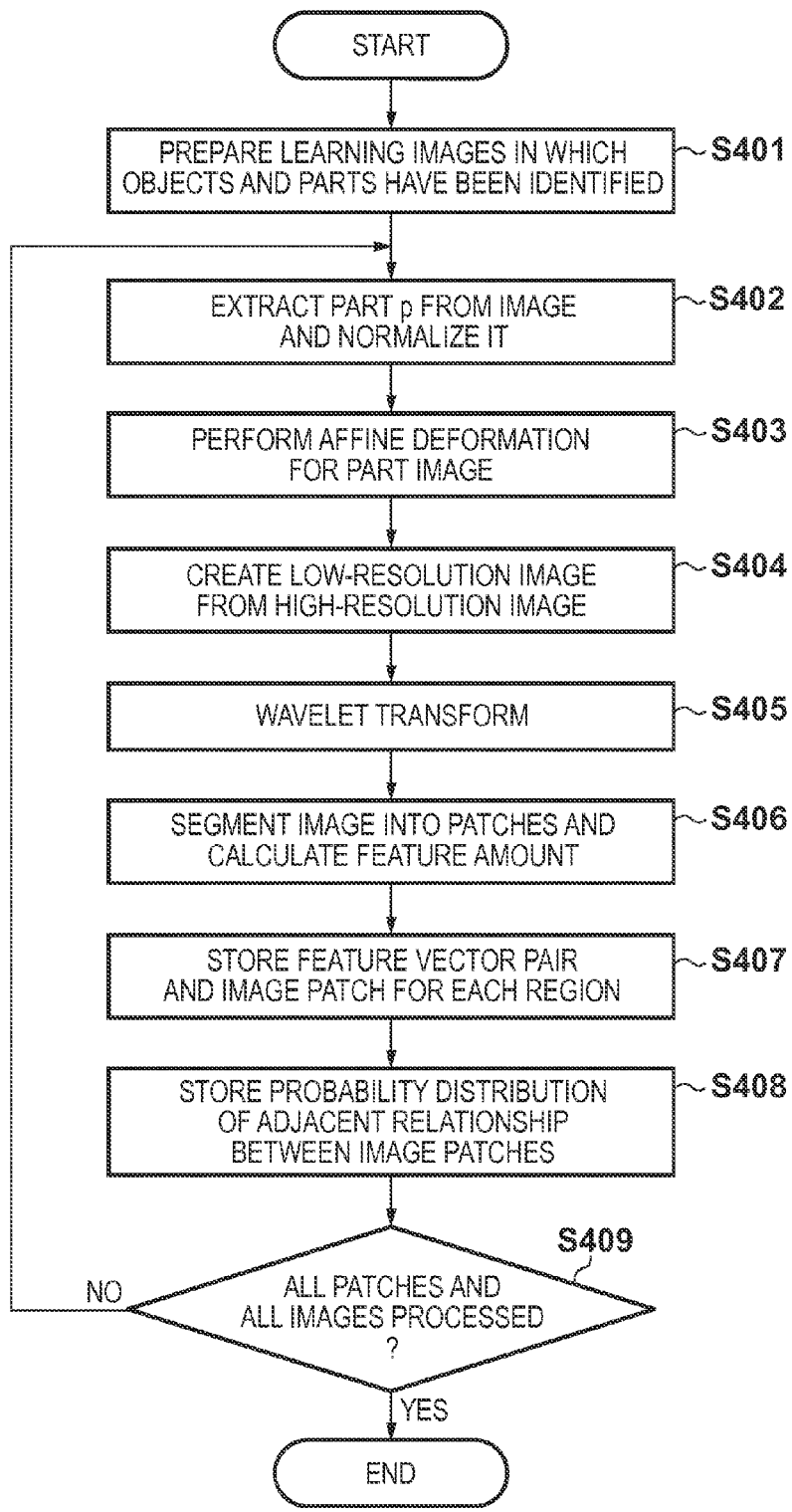
FIG. 10 is a flowchart showing the procedure of creating correction data sets for an object part region.

A method of creating correction data sets for an object part region will be described here. Especially, how to create the correction data set for the region of a part p of a specific object model o will be explained. The data set includes two elements, like the data set for a background region. One is a conversion dictionary of a high-resolution image patch $I_H(v)$ and a low-resolution image patch $I_L(v)$ for the position v. The other is an a-priori probability representing whether the two arbitrary high-resolution image patches $I_{Hi}$ and $I_{Hj}$ are adjacent. Unlike the correction data set for the background region, the correction data set for the part region is created by learning different conversion dictionaries depending on the coordinate position v on the part p. The procedure will be described below with reference to FIG. 10.

(1) A set of high-resolution learning images in which an object region and part regions included in the object are identified in advance is prepared. Each learning image includes the regions of the object o and the part p of the object o (S401).

(2) The part p is extracted from a learning image, and a part image $p_{H0}$ is generated by normalizing the tilt bearing, aspect ratio, and size of the region (step S402).

Figure 11:
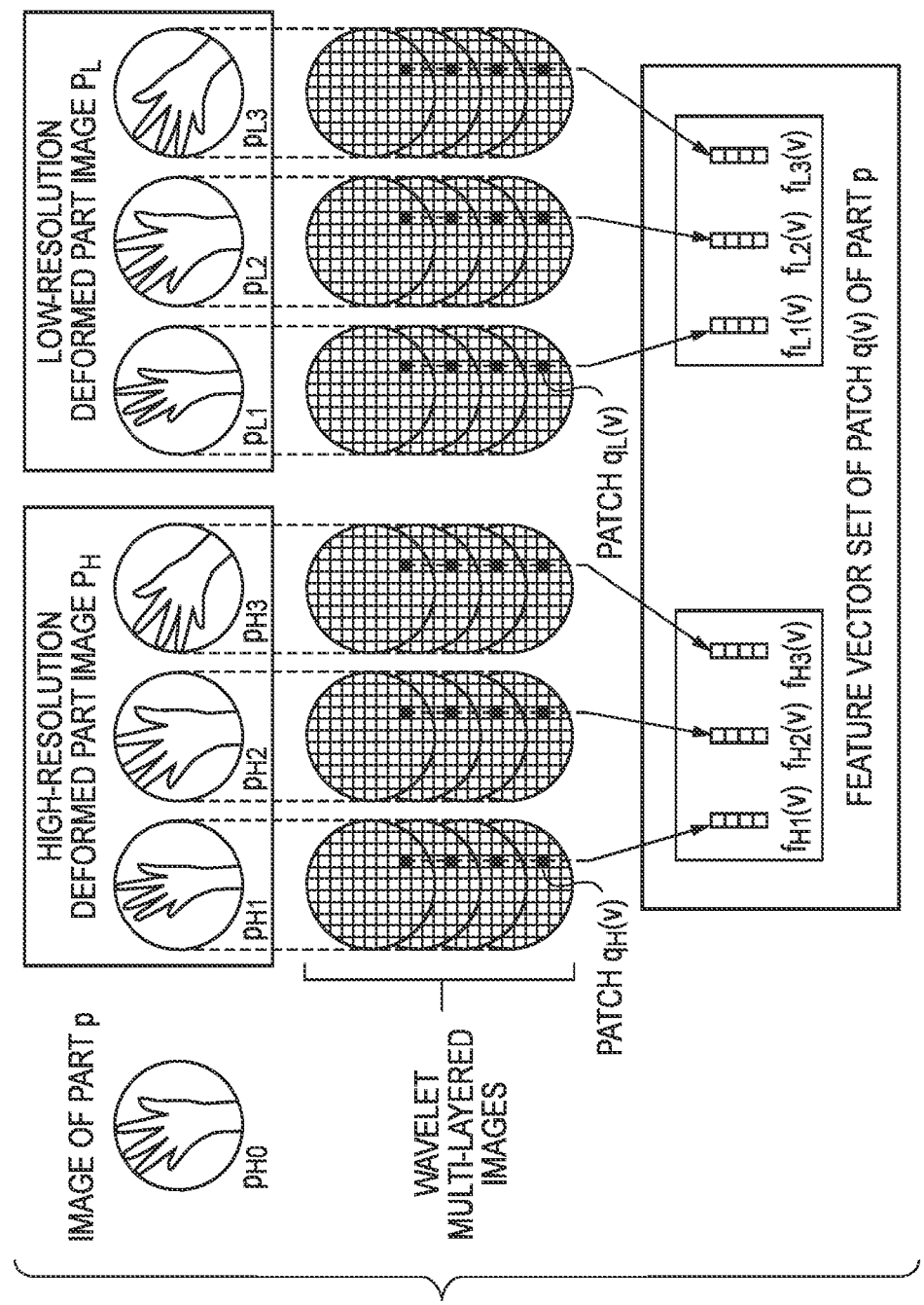
FIG. 11 is a view showing a method of creating correction data sets for an object part region.

(3) Affine deformation such as random enlargement/reduction and rotation within a predetermined range is performed for the part image $p_{H0}$, as shown in FIG. 11, thereby creating a set $P_H=\{P_{H1}, p_{H2}, \ldots, P_{Hm}\}$ of m deformed images (S403).

(4) For $P_H=\{P_{H1}, \ldots, P_{Hm}\}$, down-sampling and subsampling are performed n times each, thereby creating a low-resolution image set $P_L=\{p_{L1}, P_{L2}, \ldots, P_{Lm}\}$ having the same size as that of $P_H$ (S404).

(5) For each of the high-resolution deformed images and the low-resolution deformed images, binary discrete wavelet transform is performed j times to obtain (3j+1) wavelet multi-resolution images $\{HH_1, HL_1, LH_1, HH_2, HL_2, \ldots, LL_j\}$ for each image (S405).

(6) As shown in FIG. 11, the normalized part region is segmented into image patches each having a size of $w_q \times h_q$. The pixel values of images patches $q^0(v), q^1(v), \ldots, q^n(v)$ of different layers at the position v of the wavelet images are put together for each of the high-resolution images and the low-resolution images, thereby creating the feature vectors $f_H(v)$ and $f_L(v)$ (S406).

(7) The pairs of image feature vectors are stored for each position v of the image patches.

A set of feature vectors of a high-resolution image: $\{(f_{Hi}(v), f_{Li}(v))|_{i=1,\ldots,n}\}$ and Patches of corresponding high and low-resolution images: $Q_H(v)=\{q_{H1}(v), (q_{H2}(v), \ldots, q_{Hn}(v)\}$ and $Q_L(v)=\{q_{L1}(v), q_{L2}(v), \ldots, q_{Ln}(v)\}$ are stored together to create a conversion dictionary for correction of the image patch at the position v of the part p (S407).

(8) The a-priori probability that the image patches $Q_H\{q_{H1}, q_{H2}, \ldots, q_{Hn}\}$ of the high-resolution image appear adjacently is calculated and stored (S408).

(9) Letting $\Omega_p$ be the region of the part p, steps (1) to (8) are performed for all positions $v \in \Omega_p$ and all learning images, thereby creating correction data for each position v of the part p (S409).

For the affine deformation of step S403, a plurality of data need to be prepared to perform natural correction even for a change in the appearance of the object. This processing has the effect of increasing learning data for a target with a few learning images. However, the parameters of affine deformation need to be set to appropriate values because an excessively wide range increases wasteful data and degrades the correction accuracy. Projective transformation or the like may be used for deformation if it is consistent with the above purpose. Note that the method of increasing the data sets by such deformation transformation is not limited to creating the data sets for an object part region and may be used to create the correction data sets for a background region.

Concerning an image patch including a region of the boundary in the image patch set $Q_H(v)$ of step S407, a mask image set $Q^m_H(v)$ of image patches representing the graphic and background regions of pixels is also stored. The mask image set $Q^m_H(v)$ is used to integrate the images of the image correction results, as will be described later.

The remaining detailed procedures comply with the above-described method of creating the correction data sets for the background region.

(C) Creating Correction Data Sets for Non-Part Region of Object

A method of creating correction data sets for an object non-part region will be described here. Regions of a part such as an eye, nose, or hand have a common shape and the position correspondence between subjects is relatively clear. To the contrary, a region between parts such as a cheek or body is less structural or has an indefinite shape so the position correspondence between subjects can hardly be determined. In this embodiment, the position correspondence is obtained even for a non-part region based on the relative positional relationship between parts, and the correction data set is learned on the position basis.

The correction data set includes the conversion dictionary of the high-resolution image patch $I_H(v)$ and the low-resolution image patch $I_L(v)$ and the a-priori probability of the adjacent relationship between the image patches $I_{Hi}$ and $I_{Hj}$, like the data set for a part region. For the correction data, different conversion dictionaries are stored depending on the coordinate position v on the object o. The procedure will be described below with reference to FIG. 12.

(1) A set of high-resolution learning images in which the model of the object o and the positions of the object o and parts are identified in advance is prepared. Each learning image includes the object o (S501).

(2) For all positions v of a non-part region of the object o, a corresponding position v' on each learning image and a region $r_H(v')$ about v' are obtained. The position v' on the learning image is obtained using the position relative to a neighboring part by a method to be described later (S502).

(3) Affine deformation such as random enlargement/reduction and rotation within a predetermined range is performed for the region $r_H(v')$ by the same method as in step S403 described above, thereby creating a set $R_H = \{r_{H1}, r_{H2}, \ldots, r_{Hm}\}$ of m deformed images (S503).

(4) A low-resolution image set $R_L = \{r_{L1}, r_{L2}, \ldots, r_{Lm}\}$ for $RH = \{r_{H1}, r_{H2}, \ldots, r_{Hm}\}$ is created in accordance with the same procedure as in step S404 described above (S504).

(5) Wavelet multi-resolution images are obtained in accordance with the same procedure as in step S405 (S505).

(6) The feature vectors $f_H(v)$ and $f_L(v)$ are created for each of the high-resolution images and the low-resolution images in accordance with the same procedure as in step S406. However, the pair of feature vectors $f_H(v)$ and $f_L(v)$ is created using not the entire region (v') but only a patch q(v') having the size of $w_q \times h_q$ about v' (S506).

(7) The pairs of image feature vectors are stored for each position v on the model of the object o.

A set of feature vectors of a high-resolution image: $\{(f_{Hi}(v), f_{Li}(v))|_{i=1,\ldots,n}\}$ and Patches of corresponding high- and low-resolution images: $Q_H(v') = \{q_{H1}(v'), q_{H2}(v'), \ldots, q_{Hn}(v')\}$ and $Q_L(v') = \{q_{L1}(v'), q_{L2}(v'), \ldots, q_{Ln}(v')\}$ are stored together to create a conversion dictionary for correction of the image patch at the position v of the object o (S507).

(8) The a-priori probability that the image patches $Q_H = \{q_{H1}, q_{H2}, \ldots, q_{Hn}\}$ of the high-resolution image appear adjacently is calculated and stored (S508).

(9) Letting $\Omega_n$ be the non-part region, steps (1) to (8) are performed for all positions $v \in \Omega_n$ and all learning images, thereby creating correction data for each position v of the non-part region (S509).

More specifically, let $\Omega_o$ be the whole region of the object o, and $\Omega_p$ be the region of each part p. A region $\Omega_n = \Omega_o - \cup \Omega_p$ obtained by excluding the regions $\cup \Omega_p$ of all parts from $\Omega_o$ is defined as the non-part region $\Omega_n$. As another implementation example, the whole region of the object may be defined as the non-part region $\Omega_n$ ($\Omega_n = \Omega_o$). In the latter case, a region $\Omega_n \cap \Omega_p$ where a part region and a non-part region overlap occurs. In image correction of the subsequent stage, correction is performed independently. When integrating the correction results, the correction result of $\Omega_p$ is overwritten on that of $\Omega_n$.

Figure 13A:
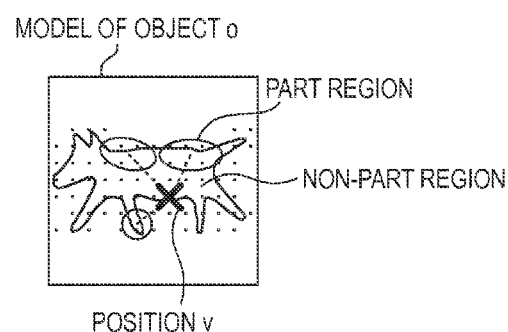
FIGS. 13A and 13B are views showing a method of creating correction data sets for a region between parts of an object.
Figure 13B:
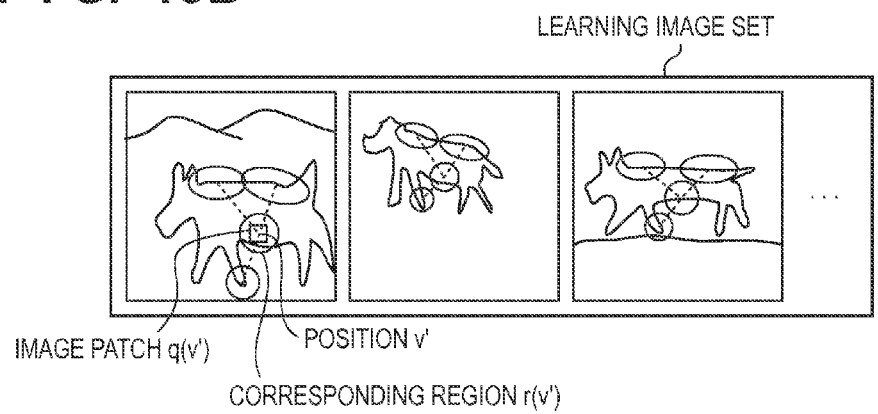

As the positions $v \in \Omega_n$ on the non-part region, a grid-like dense point group is set on the non-part region $\Omega_n$ and used. FIGS. 13A and 13B show an example of the grip-like positions v.

As the method of obtaining the corresponding position v' on the learning image from the position v on the model in step S502, for example, the local linear embedding method (see S. Roweis and L. Saul, "Nonlinear dimensionality reduction by locally linear embedding", Science, v. 290 no. 5500, Dec. 22, 2000. pp. 2323-2326) is used. According to the local linear embedding method, when an arbitrary vector v is expressed by linear combination of a plurality of points $\eta_j$ in the neighborhood, weighted vectors w whose total sum is 1 and which minimize the square error given by $$\varepsilon = \left| v - \sum_j w_j \eta_j \right|^2 \quad \text{[Mathematical 12]}$$

can be obtained by $$w_j = \frac{\sum_k C_{jk}^{-1}}{\sum_{lm} C_{lm}^{-1}}, \quad \text{[Mathematical 13]}$$

$$C_{jk} = (v - \eta_j) \cdot (v - \eta_k).$$

Let v be the position on the model, $\eta_k$ be the position of the part of k-nearest neighbor k on the model, and $\eta_k'$ be the position of the part of k-nearest neighbor k. Using w, the corresponding position v' on the learning image can be obtained by $$v' = \sum_j w_j \eta_j' \quad \text{[Mathematical 14]}$$

as shown in FIG. 13B. When an appropriate point $v + \Delta x$ near v on the model is projected onto the learning image to obtain $v' + \Delta x'$, the size of the region r(v') around v' can be determined by multiplying an appropriate coefficient. In FIG. 13B, the region r(v') is expressed by a perfect circle. However, the region r(v') may be defined as an elliptical region having a tilt bearing by obtaining the variance and covariance using a plurality of points $v + \Delta x_i$ and $v + \Delta y_i$.

Note that when actually performing image correction for an object non-part region, the correction needs to be performed by obtaining the position correspondence between the input image and the object model one by one in accordance with the same procedure as in step S502. More specifically, the part regions and the non-part regions of the input image are identified first. The position v' of a non-part region of the input image and the corresponding nearest position v on the object model are determined in accordance with the same procedure as in step S502. Then, image correction is performed for the position v' using the data set of image patch pairs associated with the position v. This processing is executed for all positions v'.

The method of creating correction data sets for the (A) background region, (B) object part region, and (C) object non-part region has been described above. Especially, in this embodiment, the method of creating object correction data sets using a part-based object model has been described.

Note that although a case in which the correction data sets are classified into three types has been described in the embodiment, the present invention is not limited to this. As another considerable form, the correction data sets may be classified into, for example, two types. More specifically, for example, instead of discriminating between (B) part region and (C) non-part region, correction data sets may be created using the method of (C) for all regions $\Omega_o$ of an object. As still another form, for (C) non-part region, correction data sets may be formed independently of the position using the same method as that for (A) background region.

(Image Correction)

The image correction unit 107 is a functional element that performs image correction. Image correction to be done by the image correction unit 107 includes, for example,

- compositing a high-resolution image from a low-resolution image
- removing blurs, removing defocus, and correcting colors
- compositing a wide-dynamic-range image from a narrow-dynamic-range image
- compositing a color image from a monochrome image
- compositing an image captured under ambient light from an image taken using an electronic flash
- beauty treatment
- deforming the human body shape
- converting a person's face to another person's face In this embodiment, the image correction unit 107 uses the conditional probability field that is a kind of Markov network. FIG. 14 illustrates the structure of the conditional probability field of this embodiment. Defining the image patch at each position v of the subject region as a node of the probability field, image correction is performed in accordance with the following procedure. Note that this processing is executed in steps S105 and S112 of FIG. 2.

(1) Each of the subject regions, background regions, object part regions, and object non-part regions is enlarged to the scale for resolution increase. The part regions simultaneously undergo normalization processing of the aspect ratio and tilt. The following processes are executed for each region type.

(2) The image is wavelet-transformed to create multi-resolution images. Each image is segmented into image patches each having the size of $w_q \times h_q$. The feature vector $f_{IN}(v)$ of the input image is created for each patch.

(3) An external energy is obtained for the image patches $\{q_{Hj}(v)|_{j=1,\ldots,n}\}$ of all high-resolution images associated with the position v of each region.

(4) An internal energy is obtained for the image patches $\{q_{Hj}(v)|_{j=1,\ldots,n}\}$ of all high-resolution images associated with the position v of each region.

(5) Using the sum of the two energies and a temperature coefficient T, the occurrence probability representing the state $\{q_{Hj}(v)|_{j=1,\ldots,n}\}$ to be taken by the node at the position v is obtained. The node state is determined in accordance with the occurrence probability. This processing is performed for all positions $v \in \Omega$ of each region.

(6) The temperature coefficient T is decreased, and steps (3) to (5) are repeated until T equals a predetermined value.

Calculation of the external and internal energies will be described here in detail.

The external energy is determined by the node state and the input image. Let $\{(q_{Hi}(v), q_{Li}(v))|_{i=1,\ldots,n}\}$ be an image patch pair candidate stored for the node v, and $\{(f_{Hi}(v), f_{Li}(v))|_{i=1,\ldots,n}\}$ be the corresponding feature vector pair. If the state of the node v is the image patch $q_{Hj}(v)$, the external energy of the node v is defined as $$E^{ext}(v) := \frac{1}{\lambda_1} \|\mathrm{diag}(w) \cdot (f_{in}(v) - f_{Lj}(v))\|^2 \quad \text{[Mathematical 15]}$$

where $\lambda_1$ is the adjustment parameter of energy, w is the weighted vector, $f_{IN}(v)$ is the image feature amount at the position v on the input image, and $f_{Li}(v)$ is the feature vector of the low-resolution image patch $q_{Li}(v)$ corresponding to the state $q_{Hj}(v)$ of the node v.

Note that as the image correction data set, not only the data set stored in the node at the position v but also a correction data set stored in a neighboring node is usable. This allows performance of image correction robustly against misalignment to some extent. For example, the above expression is expanded to $$E^{ext}(v) := \quad \text{[Mathematical 16]}$$
$$\frac{1}{\lambda_1} \|\mathrm{diag}(w) \cdot (f_{in}(v) - f_{Lj}(v))\|^2 \exp\left(-\frac{1}{\beta} d^2(v, v_{adj})\right)$$

where $v_{adj}$ is the nearest node that stores $(q_{Hj}(v), q_{Lj}(v))$ as the correction data set pair, $d_2(v, v_{adj})$ is the distance between the node v and the node $v_{adj}$, and $\beta$ is the distance adjustment parameter.

The internal energy is determined by the state of the node v and the state of a node adjacent to the node v. Using the a-priori probability of the adjacent relationship between the image patches learned in advance by the above-described method, the internal energy is defined by $$E^{int}(v) := \frac{1}{\lambda_2} \sum_{u \in N} p(q_H(v) = q_{Hj}, q_H(v+u) = q_{H(v+u)}) \quad \text{[Mathematical 17]}$$

where $\lambda_2$ is the adjustment parameter of energy, N is the set of four neighbors of the node, and $q_{H(v+u)}$ is the state of each adjacent node (v+u) of the four neighbors.

Letting $\Omega$ be the whole region of the image, the total energy of the network is given by $$E^{total} = \sum_{v \in \Omega} E^{int}(v) + E^{ext}(v) \quad \text{[Mathematical 18]}$$

The image that minimizes this energy is the correction result to be obtained. The total energy is reduced by updating the state of each node v based on the probability given by $$\frac{1}{Z} \exp\left\{-\frac{1}{T}(E^{int}(v) + E^{ext}(v))\right\} \quad \text{[Mathematical 19]}$$

where Z is the normalization constant, and T is the temperature. Minimization is performed by gradually lowering the temperature.

Blur/Defocus Removal as Preprocessing

As another effective form of the image correction unit according to this embodiment, it may include a blur/defocus removing unit (not shown) that detects and removes a blur or defocus by preprocessing before image correction. The blur or defocus to be removed here is a blur caused by the motion of the subject or the image capturing apparatus itself or defocus caused by a focusing failure.

A blur or defocus to some extent is corrected by image correction performed by the image correction unit 107. However, for example, a large motion blur equal to the object size of the subject cannot completely be corrected at a high possibility. However, if the point spread function can be estimated, the motion blur can be removed to a degree by a signal processing method based on deconvolution such as a Wiener filter. Hence, correcting a blur or defocus as preprocessing before image correction of the image correction unit 107 is effective. Blur/defocus removal can be done either before subject detection or as region-based processing after a region is identified by subject detection.

The point spread function of a blur/defocus is unknown in general. The removal is performed by identifying the point spread function using a known method as in, for example, R. Fergus, B. Singh, A. Hertzmann, S. T. Roweis and W. T. Freeman, "Removing Camera Shake from a Single Photograph", ACM SIGGRAPH 2006, Vol. 25, No. 3, pp. 787-794, August 2006. Note that ripple-shaped noise (ringing) is known to occur as an artifact depending on the result of blur removal. For this reason, blur processing convolving an appropriate Gaussian function may be performed before image correction by the image correction unit 107 of the subsequent stage.

Other Variations of Image Correction

In this embodiment, the operation of the image correction unit 107 has been described by exemplifying conversion from a low-resolution image to a high-resolution image. However, the effect of the arrangement according to this embodiment is not limited to increasing the image resolution. Various other types of image correction can be implemented by changing the arrangement of the correction data sets. Several implementation forms will be explained below using examples.

For example, as an implementation form, a data set of a bright-colored high-tone scenic image in a wide dynamic range is defined as a high-quality image. This image is taken in advance by a specialist cameraman using specialized equipment. The high-quality image is degraded by, for example, decreasing the bit amount of tone, thereby generating a low-quality image. Next, region categories such as mountain and forest are identified. The feature vector correspondence between the high-quality image and the low-quality image is stored for each region to create a correction data set. Using the correction data sets makes it possible to implement accurate color correction and dynamic range widening for each region of the subject.

According to this implementation form, when a scenic image captured by an inexpensive camera in a narrow dynamic range is input, the image is converted into a bright-colored image in a wide dynamic range as if it were taken by a professional cameraman using expensive equipment. Note that as the degraded image pattern, various assumable patterns of, for example, image compression by JPEG may be created and used.

For example, as another implementation form, a data set of a human image captured under ambient light is defined as a high-quality image. An image of the same subject captured using an electronic flash is defined as a low-quality image. These photos can easily be obtained by capturing two images by selectively using the electronic flash upon image capturing. Using these images as the correction data makes it possible to implement an image correction function of converting a high-contrast skin texture or a so-called red-eye region obtained by image capturing using the electronic flash into a more desirable image as if it were captured under ambient light.

As a conventional method, the highlight region of a face is filled with peripheral pixels to reduce highlight detail loss caused by the electronic flash. If strong highlight detail loss is generated in a wide region, this method cannot reconstruct the original texture. In this embodiment, however, position-based correction is performed. Hence, image correction is possible even in this case. Additionally, since correction is performed for each part or for each local region including a part, the correction target is not limited to a front face.

For example, as still another implementation form, a correction data set is generated from a pair of a low-quality image and a high-quality image created using blur/defocus images of a plurality of patterns. When correction data sets for a possible blur/defocus such as camera shake caused by mirror shock of the camera are formed, an image correction function capable of effectively removing the blur/defocus can be implemented.

For example, as yet another implementation form, a color image is stored as a high-quality image, and an image obtained by converting a color image into a monochrome image is stored as a low-quality image. This enables to implement image correction for compositing a color image from a monochrome image. Generally, estimating colors from a monochrome image is a problem of failure setting. However, the solution space of the correspondence can also be limited to some extent by identifying the background or object region. For this reason, a region identified as, for example, a human skin can correctly be converted into an image patch of flesh color.

However, the above-described form of image correction for generating a color image requires some additional contrivances to be explained below. Since the Markov network used in this embodiment considers the continuity in the neighborhood as an internal potential, the color continuity is maintained for adjacent image patches. However, in a region far apart, the tone may gradually change to form spots. A solution to prevent such an unwanted phenomenon, for example, belief propagation is used together. For example, the tone of a region is represented by the average and variance of a* and b* of the CIE L*a*b* color space. This is transferred to an adjacent node as a message of belief propagation. Simultaneously, the edge intensity is calculated using a Laplacian filter or the like so as not to transfer the message to a pixel having an edge intensity higher than a predetermined value. This allows the tones of regions to be unified. For further details of belief propagation, see, for example, Erik B. Sudderth and William T. Freeman, "Signal and Image Processing with Belief Propagation", Signal Processing Magazine, IEEE, Volume 25, Issue 2, March 2008, pp. 1146-141.

(Image Integration)

In this embodiment, image correction is performed for each region. The image integration unit 65 provided in the image correction unit 107 integrates the correction results to obtain a final output image. This processing is executed in step S113 of FIG. 2. Since each part region is normalized in its size and ratio, they are adjusted to the size and ratio of the original image by inverse transform. The inversely transformed part region images are overlaid on and composited with the non-part region images to obtain an object region.

To composite the boundary between an object region and a background region or the boundary between object regions, a mask image is used. As described above, a mask image $q^m_H(v)$ representing a region boundary is stored in a high-resolution image patch $q_H(v)$ of the object region in advance. The mask $q^m{}_H(v)$ is blurred by a predetermined Gaussian function to form an alpha channel. A plurality of regions are overlaid and blended to naturally composite them. A pixel of small gap may occur between the subject regions depending on the correction result. Between an object and a background region, the background region is used to fill a gap, thereby preventing gap formation. Between object regions, both regions are used to fill the gap. The lost region filling method has widely been studied, and various known methods have been proposed. One of these methods is used (for example, see M. Bertalmio, G. Sapiro, V. Caselles and C. Ballester, "Image Inpainting", Proceedings of SIGGRAPH 2000, New Orleans, USA, July 2000).

As described above, according to the arrangement of this embodiment, subjects of various categories are detected using subject models. Each region of a subject is identified. Position-based image correction is performed by selecting inappropriate correction data set for each region. This makes it possible to perform image correction such as image quality increasing or blur/defocus removal without losing the original structures of various objects in the natural image.

An embodiment will be described next in which image correction data sets are created using images similar to an input image instead of preparing all correction data sets in advance. This embodiment is more advantageous than the above-described embodiment in several points.

For example, in the above-described embodiment, the method of identifying a subject using context has been explained by exemplifying a microwave oven and a TV set. In the above-described embodiment, the context cannot be used for learning without preparing the two categories "microwave oven" and "TV set" in advance. From the viewpoint of applying image correction to a product such as a digital camera, it is very difficult to learn all subject categories in advance. Especially, when the subject is an artifact or a product, a subject having a new outer appearance may come on in the future.

According to this embodiment, even in this case, the context can effectively be used by the method to be described below. For example, assume that an image of the microwave oven in the kitchen is corrected to a high-quality image. First, object models are learned not for categories such as "microwave oven" and "TV set" but for a level such as "home electrical appliance". Next, many images (images of kitchen scene) similar to the input image are collected from the Internet or a database. Subjects similar to the "home electrical appliance" of the input image are detected from the collected images. Image patches for correction data sets are formed in accordance with the same procedure as described in the above embodiment. As a result, the correction data sets include a lot of image patches of microwave ovens, and appropriate image correction can be performed.

When similar images are used, correction data sets specialized to a subject at a level more than the category level can be formed online for image correction without individually learning detailed categories for a similar but different subject in advance. Even for a new object, image correction can be done without newly learning the category.

Figure 15:
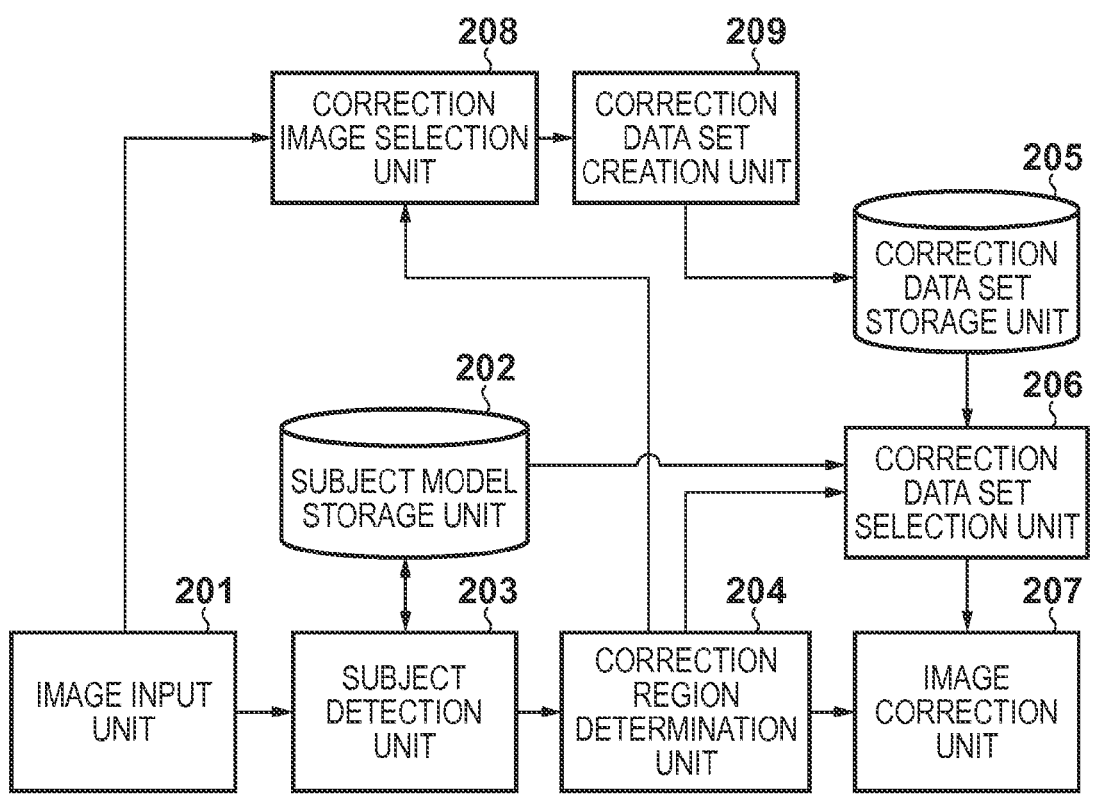
FIG. 15 is a block diagram showing an image processing apparatus according to another embodiment.

FIG. 15 is a block diagram of this embodiment. Some of the functional modules are the same as in the above-described embodiment, and the different points from the above-described embodiment will be described in particular.

In the processing procedure of the image processing apparatus according to this embodiment, first, a subject and a region to be subjected to image correction are determined in the input image, as in the above-described embodiment. A correction image selection unit 208 selects reference images to be used to create a correction data set. The images selected here can be classified into two types: captured images in the camera and images existing on a network. A correction data set creation unit 209 creates correction data sets online from the selected images. An image correction unit 207 performs image correction using the correction data sets, as in the above-described embodiment.

Figure 16:
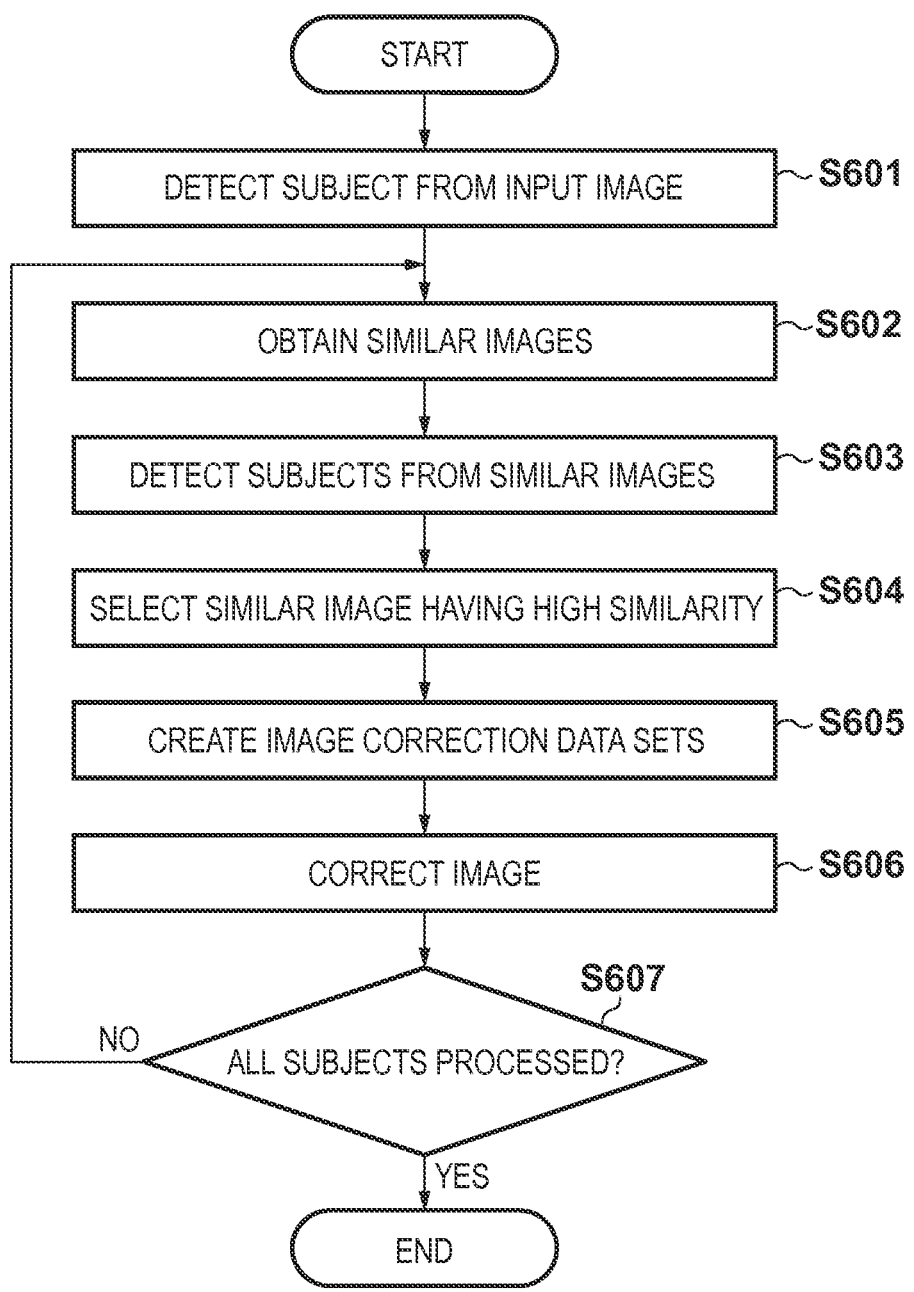
FIG. 16 is a flowchart showing the outline of the procedure of the image processing apparatus according to another embodiment.

The procedure of creating correction data sets using image data on a network will be explained with reference to FIG. 16. (1) A subject is detected from the input image (S601). (2) Using composition similarity or the like, a plurality of images similar to the input image are acquired from an image database on the network (S602). (3) A subject detection unit 203 detects a subject from each similar image (S603). (4) Out of the subjects of the same category as that of the subject of the input image, only a subject image having high appearance similarity is selected as a correction image (S604). (5) A correction data set is created from the correction image using the same method as described in the above embodiment (S605).

Note that as the method of acquiring similar images using the image composition or the like in step S602, a known method using, for example, the distribution of feature vectors of the subject or the layout relationship of the subject is used (for example, see Liu et al. or Divvala et al.) With this processing, for, for example, a kitchen scene, a plurality of similar images of kitchen scene can be collected from the image database.

To judge the similarity in step S604, the feature amount such as the color histogram or texture distribution of the subject is compared.

Still another embodiment will be described next in which correction data sets are created using captured image data in the camera. For example, there exist photos having a composition or timing desirable for the user but containing an error such as a blur caused by subject motion, camera shake, or defocus. On the other hand, some photos are taken before and after those photos, which are undesirable in the composition or timing but contain no errors for image quality. A method of improving the quality of a failure image using the latter images will be described below.

In general, images captured at preceding and succeeding timings can include the same subject. For example, if the subject is a person, images having time stamps close to each other can include the same person in the same clothing. If the subject is a background region, images having close GPS information can include the same background. Images having close categories or captions added by the user in the image sharing database on a PC or a network can include similar subjects. It is therefore effective to detect similar subjects from such images of close attributes to create correction data sets.

The procedure will be described. First, a low-quality region to be subjected to image correction is judged. This judgment can be done using, for example, the method described in the section "Correction Region Determination" of the above-described embodiment. Referring back to FIG. 16, (1) A subject is detected from the correction region (S601). (2) A plurality of similar images whose attribute upon image capturing such as GPS information or time stamp is close to that of the input image are acquired (S602). (3) A subject detection unit 203 detects a subject from each similar image (S603). (4) Out of the subjects of the same category as that of the subject of the input image, only a subject image having high appearance similarity is selected as a correction image (S604). (5) A correction data set is created from the correction image using the same method as described in the above embodiment (S605).

The embodiment has been described assuming images in the single camera. However, another form is also possible in which, for example, a camera is provided with a wireless device so that a plurality of cameras of users who are in the same place can share images, and similar images can be selected by the above-described method. Alternatively, for example, the users may share image data in the image sharing database on the network. Otherwise, several frames may automatically be captured at preceding and succeeding timings upon image capturing without making the user aware, and stored together as correction data.

The method of automatically selecting the correction image has been described above. However, a method of causing the user to determine the correction image is also considerable. For example, the user may designate a similar image in the camera as the correction image using an instruction device (instruction input device 996) provided in a correction image selection unit 208. The user may present the start and end timings of image capturing using another instruction device. A moving image or a still image of the subject to be subjected to image correction may then be captured during the time and designated as a similar image.

As described above, the arrangement according to this embodiment selects a similar image group including a subject similar to the subject in the input image, and dynamically forms image correction data sets from the image group. This enables to perform accurate image correction specialized to an individual subject as compared to image correction using only correction data sets prepared in advance. In addition, using similar images allows to perform image correction using correction data sets specialized to various subjects. According to this embodiment, it is also possible to perform image correction using preceding and succeeding images including the same subject even if image capturing has failed.

An extended method of the method of the above-described embodiment will be described next. In this method, each subject category is subdivided into subcategories based on the appearance difference to do more accurate image correction.

In pattern recognition, the divide-and-conquer approach that divides the target to reduce the scale of the problem for individual solution is often effective. However, dividing a subject category optimized to discriminate a subject and dividing a category to reproduce the outer appearance of a subject to high image quality are not always the same.

For example, detailed information such as dog's shiny coat of hair or a shiny glass surface is important when evaluating the success/failure of image reconstruction but not always effective as a key for object discrimination. Hence, it is effective to classify objects into categories and then collect objects with similar outer appearances and create different correction data sets for them so as to more appropriately correct the images of the objects. This is referred to as an appearance subcategory here. The appearance subcategory is a subcategory different from the shape subcategory or orientation subcategory described in the above embodiment.

Figure 17:
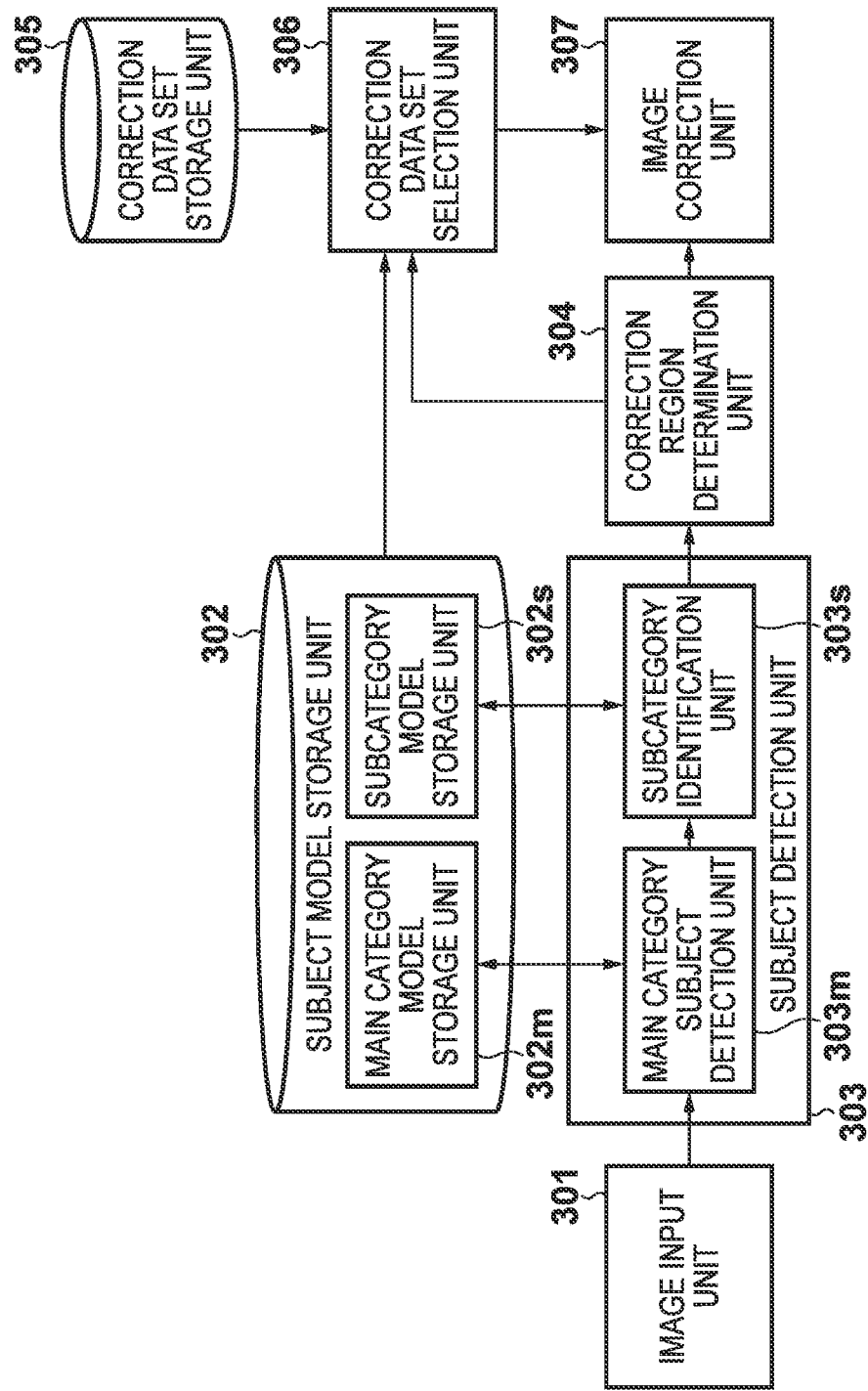
FIG. 17 is a block diagram showing an image processing apparatus according to still another embodiment.

FIG. 17 is a block diagram of this embodiment. The block diagram and the operation procedure of this embodiment are basically the same as those of the above-described embodiment. This embodiment is different in that a subject detection unit 303 includes a main category subject detection unit 303m and a subcategory identification unit 303s, and a subject model storage unit 302 includes a main category model storage unit 302m and a subcategory model storage unit 302s.

Note that the category of the above-described embodiment is called a main category in this embodiment.

Details of the operation of this embodiment will be described. An image input unit 301 inputs an image or a moving image. The main category subject detection unit 303m reads out main category models of subjects from the main category model storage unit 302m. The category of the subject region is identified using the main category models. For a main category region as an object candidate, object models are read out to identify the object. The operations of the main category subject detection unit 303m and the main category model storage unit 302m are the same as those of the subject model storage unit 102 and the subject detection unit 103 of the above-described embodiment.

For the region whose main category has been identified, the subcategory identification unit 303s reads out subcategory models and identifies the more detailed category to which the subject belongs. That is, the subcategory of the subject is discriminated by referring to the model information of each subcategory. The subcategories are obtained in advance by dividing each main category into a plurality of more detailed categories based on the appearance similarity of the subject.

Dividing a main category into subcategories is performed as follows in accordance with, for example, a procedure similar to the method called Bag of Words in pattern recognition.

(1) All high-quality image patches of a subject in a main category are clustered into k groups by the k-means to create an image patch code book. (2) One subject is expressed by a k-dimensional histogram using the code book. (3) Clustering is performed again by the k-means using the k-dimensional histogram as a feature vector, thereby segmenting the subject into k' pieces. (4) A cluster whose number of data is smaller than a predetermined value is merged with the nearest cluster.

A correction region determination unit 304 determines the region of the correction target by the same operation as that of the correction region determination unit 104 of the above-described embodiment. A correction data set selection unit 306 reads out correction data sets stored in advance for each subject subcategory from a correction data set storage unit 305 and sends them to an image correction unit 307. That is, the correction data sets are selected based on the subcategory discrimination result. The image correction unit 307 performs image correction fitting the purpose for the input image using the correction data sets for each subcategory.

Then subjects are classified into subcategories, as in this embodiment, the number of learning image data necessary for forming the correction data sets may be insufficient. Hence, the image correction unit 307 may perform first image correction using the correction data set of the main category and then second image correction using the data sets of the subcategory.

More specifically, for example, a bandpass filter is applied to the learning images to divide them into images of spatial frequency components equal to or lower than the intermediate frequency and images of higher spatial frequency components. Next, image correction data to be used to construct the intermediate spatial frequency image from a low-quality image is created using the learning image data of the main category. Then, image correction data to be used to construct the high-quality image from the intermediate spatial frequency image is created using the learning images of the subcategory. Thus creating two types of correction data sets enables to cope with even a small number of learning images.

As another method, the same purpose as described above can also be achieved using an eigenspace as in James et al. described in "Description of the Related Art". That is, an eigenspace is formed using all correction data sets of the main category, and the input image is projected into the eigenspace, thereby generating an intermediate-quality image. Then, a Markov network is created using only the correction data sets of the subcategory to convert the intermediate-quality image into a high-quality image. For further details, see James et al.

As still another form, a method of selecting the most appropriate result from a plurality of correction results created without identifying the subcategory upon subject detection is also effective. In this embodiment, the subcategory identification unit 303s determines one or more subcategory candidates without identifying the subcategory. The image correction unit 307 first performs coarse image correction by the above-described method using the correction data sets of the main category. Next, the image correction unit 307 performs image correction using the correction data sets of each subcategory to obtain a plurality of correction results. The best image correction result is selected from the result images. This makes it possible to perform accurate image correction using the data sets classified into the subcategories without correctly identifying the subcategory upon subject identification.

Note that, for example, the following method is considerable as the method of judging the image correction result. Image correction of the image correction unit 307 uses a Markov network as described in the above embodiment. A result for which the total energy value of the network is the smallest, that is, the most reasonable image correction result is selected as the appropriate result.

As another form of this embodiment, a camera including the image processing apparatus of the embodiment will be described assuming that the main category of the subject is "person", and the subcategory is "specific individual". According to this embodiment, image correction is performed by discriminating individuals to enable more natural image correction. The procedure will be described below.

First, the image input unit 301 captures an image to obtain an input image. The main category subject detection unit 303m detects a person using a person model as the main category model. If a person is detected, it is sent to the subcategory identification unit 303s. The subcategory identification unit 303s collates the detected person using individual model data registered in the subcategory model storage unit 302s, thereby specifying the individual. A know method is used for the collation. For example, Gabor wavelet filtering is performed at the main positions of facial organs such as the eyes and nose to calculate a feature vector, and comparison is done based on the distance such as the square norm of the calculated feature vector and the registered feature vector of the subcategory.

When the individual has been specified, correction data sets are created by identifying images including the same person in the camera, and the image correction unit 307 performs image correction. If no individual has been specified, or there are no images including the same person, correction is performed using all correction data sets of the "person" category. As described above, for a specified person, image correction is performed using correction data sets created from images of the same person, thereby improving the correction accuracy.

To register a specific individual, an individual registration mode is prepared in the camera. The user selects this mode in advance and then capture images of a person of interest. An individual model is created from the captured images and stored.

A specific individual may be registered automatically and sequentially without learning data. For example, this can be done in accordance with the following procedure. (1) The above-described feature vector is calculated from the detected person in an image. (2) If the distance from the feature vector of an individual model stored in the memory of the camera is equal to or smaller than a predetermined threshold, the feature vector is added as the data of the individual, and the correction data sets are updated. (3) If the feature vector is far apart from the feature vector of any individual model by the predetermined threshold or more, the data is registered as a new individual.

The above-described processing is sequentially executed every time a person is detected from an image captured by the camera. When the correction image data sets are updated, image correction is performed anew for each image including the person of interest that has undergone the updating.

With the above-described method, when, for example, the user is taking family photos on travels, including some failure photos containing motion blurs or the like, the correction data sets are accumulated sequentially for each individual by continuously capturing images. This implements a camera function of gradually correcting images to high quality. This embodiment assumes a person. However, the same method is also applicable to a pet such as a dog or a cat. That is, the subject categories may indicate a person or animal C, and one of registered individuals or an unknown individual may be discriminated as the subject subcategory.

Note that in a low-quality image, it is sometimes difficult to specify an individual only from the feature vectors of facial organs as described above. As another form assuming such a case, for example, data sets that store the data of feature vectors of personal clothing and corresponding time stamps may be prepared as the model data of the individual subcategory. Even if the individual cannot be judged by the feature vectors of the face, collating the person with a person in similar clothing by referring to the preceding and succeeding time stamps enables to specify the individual. As the feature vectors of clothing, for example, textures and color histograms at a predetermined plurality of points in the body region are used.

Since the outer appearance of a person changes with age, the correction data sets of a single person can be created a plurality of times by changing the learning image data in a period spanning several to about 10 years. To know the image capturing time, the user can refer to the time stamp such as Exif information at the time of image capturing. The images to be used for the correction data sets may overlap, like (1) images of 10 years ago to the present time, (2) images of 5 to 15 years ago, and (3) images of 10 to 20 years ago.

This embodiment can also be applied as a privacy filter, and this will particularly be described here. In this embodiment, the privacy of a person in an image can be protected without making the appreciator feel awkward, unlike mosaic processing or blur processing. For example, the following embodiment can be considered. Individuals such as family members are registered in the camera in advance. If an unregistered person is detected, image correction is performed randomly using correction image data sets of another individual. This allows to, for example, replace the face of an irrelevant person with the face of another person. If the whole face is replaced with another face, unnatural seams are formed. In this embodiment, however, since the replacement is done for each local region after the face structure is identified, a natural result is obtained.

Note that for more natural replacement, the gender or the age bracket is judged in advance so that one of faces of the same condition can be selected at random, instead of selecting another person's face completely randomly.

Instead of replacing a person outside the family, a person to be replaced may be registered in advance.

Note that in this embodiment, only image data stored in the internal memory of the camera undergo the image correction. However, the application range of the arrangement of the embodiment is not always limited to this. The same processing may be performed using images in a PC upon wirelessly accessing an image sharing database on the Internet or uploading the images to the PC.

An embodiment of a method of generating a plurality of subject identification results as candidates and selecting an appropriate result from them will be described next. Selecting an optimum result from the plurality of candidates enables to more increase the image correction accuracy.

The operation of this embodiment is based on the above-described embodiment. This will be described with reference to the block diagram of FIG. 1 used in the above-described embodiment. For an image input by an image input unit 101, a subject detection unit 103 identifies the category of the subject. The subject category estimation at this time is done by the same method as in the above-described embodiment. However, not only one estimation result but a plurality of category candidates and their order and estimation likelihoods are stored. Image correction is performed for the plurality of candidates, and the results are presented to the user to accept selection.

Figure 18:
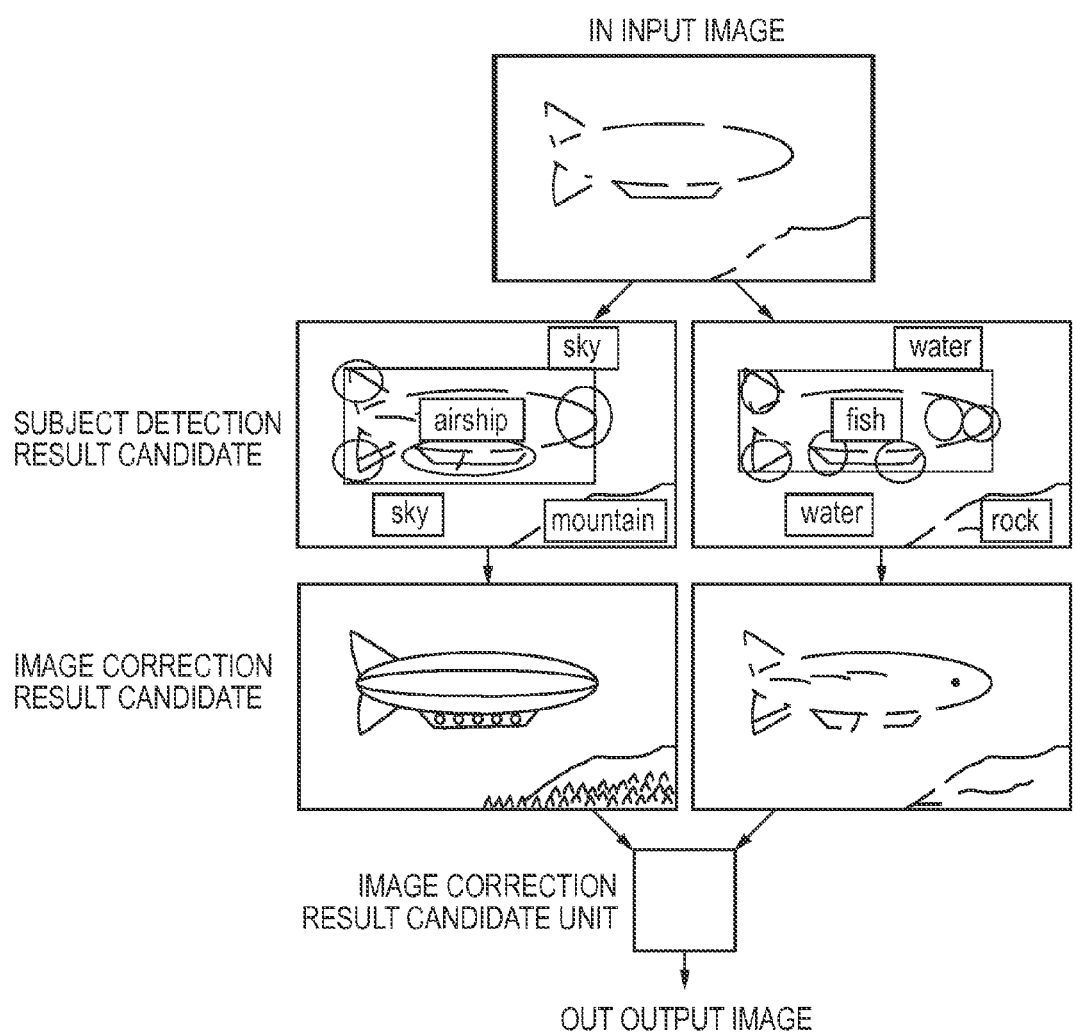
FIG. 18 is a view showing an implementation example in which one of image correction result candidates is selected.

FIG. 18 is a view for explaining this operation. First, the image processing apparatus performs image correction processing based on the subject estimation result. Corrected images are displayed in the order of subject estimation likelihood. In this case, two result images are presented. Also included a case in which the subject is detected using context information such as the adjacent relationship between subjects as the subject model. For this reason, in some cases, two completely different interpretations are presented as candidates, as illustrated. The image processing apparatus then performs acceptance processing of accepting user's selection of a more appropriate correction result via an instruction device (instruction input device 996) provided in the image correction unit.

As another example of the correction result selection device, the correction result may be determined not for each image but for each subject using a display unit (display 997) for displaying correction result images and a touch panel (instruction input device 996) provided on the display unit. The subject appearance probability changes depending on the layout relationship to a peripheral subject or the like. Hence, after the subject has been identified in accordance with a user instruction, the certainty factor of category estimation may be recalculated even for that region to display a new correction result.

As still another example of the correction result selection device, the most appropriate result may automatically be selected from a plurality of image correction candidates. To do this, for example, an image correction result for which the total energy of the above-described Markov network is low is selected.

In still another considerable form, a plurality of result candidates may be generated by changing the degree of image correction so that the user switches and compares the result candidates and selects a candidate supposed to be most appropriate using the instruction device (instruction input device 996). The degrees of image correction can be set by, when, for example, forming a high-quality image, raising the resolution to different levels.

Using another application form of this embodiment allows a new digital image processing effect to be obtained. According to this embodiment, for example, a correction data set designation device provided in a correction data set selection unit 106 can freely select a correction data set in accordance with a user instruction. The choices of correction data sets can be presented to the user as a subject subcategory candidate name list, representative images indicating a category, or image correction result images. The user selects a result supposed to be most appropriate while freely selecting and displaying the results by operating the feed button and the enter button provided on the instruction device or a program running on the PC.

According to this embodiment, for example, an image of a summer mountain can be corrected intentionally using correction data sets of an autumn mountain, thereby implementing an image processing effect of reproducing the autumn mountain. Alternatively, a scene of a daytime city can be corrected intentionally using correction image data sets of an evening city, thereby implementing a new image processing effect of reproducing the atmosphere of an evening scene.

Using still another application form of this embodiment allows another new image processing effect to be obtained. According to this embodiment, for example, the user instructs to forcibly detect an object region detected in an image as a designated object using an object designation device (instruction input device 996) provided in the subject detection unit 103. According to this arrangement, for example, a dog is detected as a sheep, and correction is then performed using the correction data sets of a "sheep" category. It is therefore possible to obtain an image processing effect of replacing a certain object with an object of another category.

In this example, a moving image is corrected. A known method aligns and composites subjects between a plurality of frames of a moving image to generate a high-quality image. However, this conventional method is not successful if the subject largely moves or deforms. A method of correcting a subject to generate a high-quality image will be described here assuming a large subject movement relative to the moving image frame rate such as person's walking.

This embodiment is extension from a still image of the above-described embodiment to a moving image. When image correction is simply performed for each frame of a moving image regarded as a plurality of still images, the results hold no temporal continuity at the image patch level. In this embodiment, a contrivance is made to add an internal energy term expressing temporal continuity to the Markov network, as will be described below.

Figure 19:
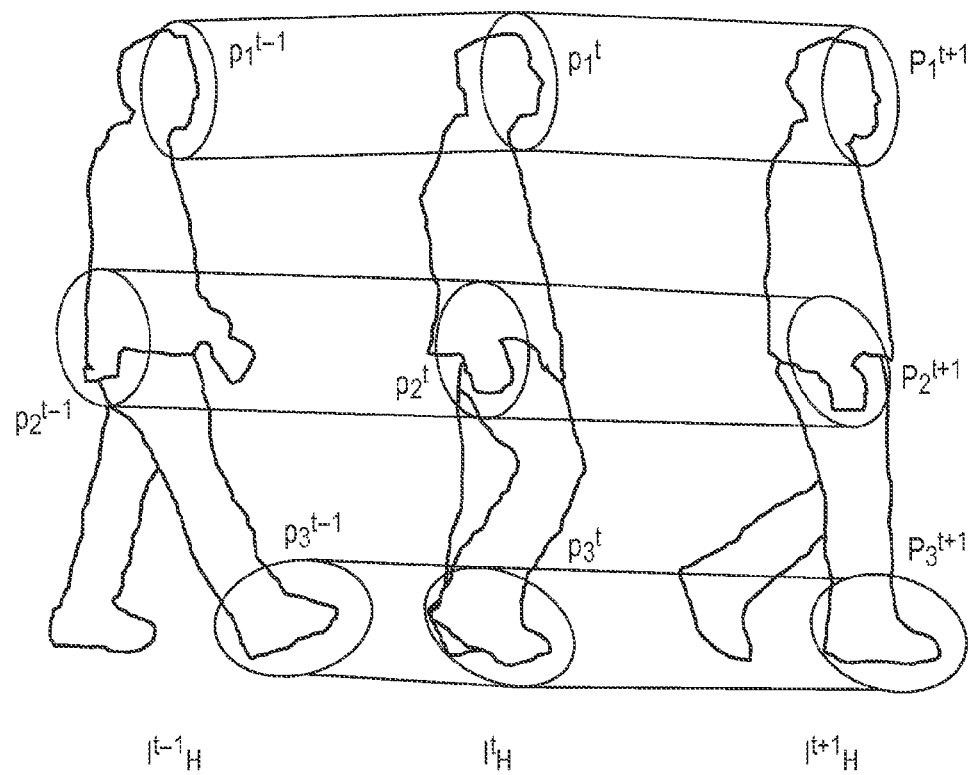
FIG. 19 is a view showing a method of correcting a moving image.

As in the above-described embodiment, the subject detection unit 103 identifies a subject. As shown in FIG. 19, let $I_t$ be the current frame of interest. Objects are detected from $I_{t-1}$ and $I_{t+1}$ using the same object model as that of the object detected in $I_t$. Next, the regions of parts $p_1$ to $p_k$ of the objects are normalized. The parts are aligned between the preceding and succeeding frames, and the correspondence between image patches $\{q^{t-1}(v), q^t(v), q^{t+1}(v)\}$ at a position v in the parts is obtained. As in the above-described embodiment, non-part regions are also aligned between the frames (not shown).

Figure 20:
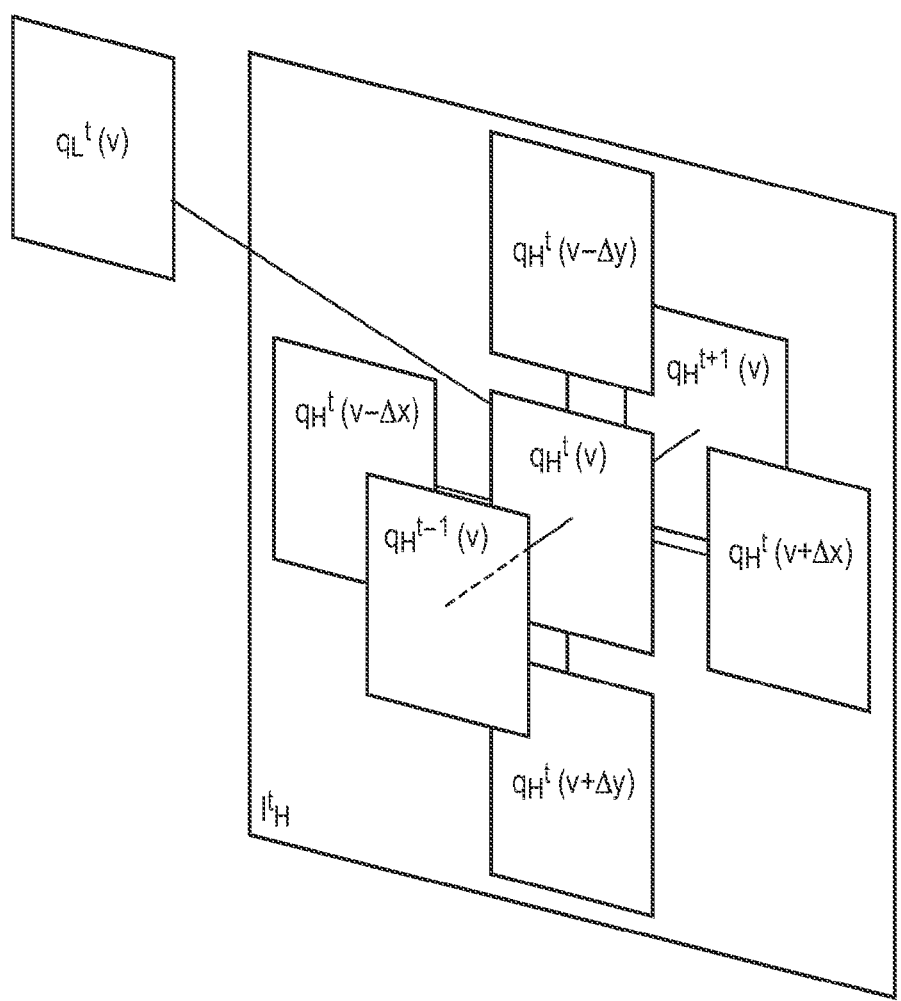
FIG. 20 is a view showing the arrangement of a Markov network for moving image correction.

The Markov network described in the above embodiment is expanded in the time direction to obtain the form as shown in FIG. 20. A term expressing the temporal continuity between the image patches is added to the internal energy to define $$E^{int}(v) := \frac{1}{\lambda_2} \sum_{u \in N} p(q_H^t(v) = q_{Hj}^t, q_H^t(v+u) = q_{H(v+u)}^t) + \frac{1}{\lambda_3} \|f_H^t(v) - f_H^{t-1}(v)\|^2 + \frac{1}{\lambda_4} \|f_H^t(v) - f_H^{t+1}(v)\|^2 \quad \text{[Mathematical 20]}$$

The external energy term can be the same as in the above-described embodiment. Image correction is performed by operating this Markov network. This makes it possible to perform image correction while maintaining the continuity between the moving image frames even for a moving or deforming subject.

In this case, to associate the image patch positions between the frames, the moving destination of a local region is estimated using a part model. However, for example, as another considerable form, optical flow estimation that is a known method may be done to identify the moving destination of a local region between preceding and succeeding frames. MPEG data holds motion compensation vector data because of its data compression method, and this data may directly be used. These methods that do not use parts can perform image correction by associating positions between moving image frames even for a background region, and may therefore be used in combination.

The above-described arrangements can perform image correction such as resolution increasing for natural images including various subjects in a wider range than before, and are therefore usable in all industries using image information. For example, it is possible to present a high-quality image or moving image to appreciators in the field of motion picture production. The arrangements also give a new visual expression technique or a technique of colorization and image quality improvement for an old video archive. In the broadcasting field, a new technique of compressing/decompressing a transmitted video signal is provided.

According to the present invention, it is possible to provide a technique of performing position-based image correction without losing the structure of an input image.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183382, filed on Aug. 18, 2010 which is hereby incorporated by reference herein in its entirety.

What is claimed is:

1. An image processing apparatus comprising:
a model storage unit configured to store model information representing a subject model belonging to a specific category, the model information including location information of a part of the subject model;
a detection unit configured to detect a first region of the subject from an input image by referring to the model information and to detect a second region of the part of the subject, corresponding to the part of the subject model, in the first region by referring to the model information;
a determination unit configured to determine a partial image for which an image correction is to be performed, the partial image including at least the detected first region of the subject in the input image;
a correction data set storage unit configured to store a plurality of correction data sets, each of the plurality of correction data sets including a plurality of first partial images being based on an image including a subject and feature vectors of second partial images being generated by processing the first partial images;
a selection unit configured to select, from said correction data set storage unit, at least one of the correction data sets on the basis of relative position between the partial image determined by said determination unit and the second region;
an extraction unit configured to extract a feature vector from the partial image determined by said determination unit;
a calculation unit configured to calculate degrees of similarities between the feature vector extracted by said extraction unit and feature vectors of the second partial images in the selected correction data set; and
a correction unit configured to select at least one feature vector of the second partial image on the basis of the calculated degrees of similarities and correct the partial image determined by said determination unit using the first partial image corresponding to the selected feature vector of the second partial image.

2. The apparatus according to claim 1, wherein said correction unit performs correction of a background region, a region of the part of the subject, and a region of a subject other than the part using different correction data sets.

3. The apparatus according to claim 1, wherein
said model storage unit stores the model information for each subcategory representing a more detailed classification of the category,
the apparatus further comprises a discrimination unit configured to discriminate a subcategory of the subject detected by said detection unit, and
said selection unit selects the correction data sets based on a discrimination result of the subcategory.

4. The apparatus according to claim 3, wherein the correction data sets stored in said correction data set storage unit include correction data sets common to all subjects belonging to a single category and correction data sets that are different for each subcategory.

5. The apparatus according to claim 1, wherein the first partial image is a high-resolution image and the second partial image is a low-resolution image.

6. The apparatus according to claim 1, wherein the first partial image is a high-dynamic range image and the second partial image is a low-dynamic range image.

7. The apparatus according to claim 1, wherein the first partial image is a blurred image and the second partial image is a sharp image.

8. The apparatus according to claim 1, wherein the first partial image is a monochrome image and the second partial image is a colored image.

9. The apparatus according to claim 1, wherein the first partial image is a toneless image and the second partial image is a bright colored image.

10. The apparatus according to claim 1, wherein the first partial image is an image captured with ambient light and the second partial image is an image captured with using flush light.

11. An image processing method of an image processing apparatus including a model storage unit configured to store model information representing a subject model belonging to a specific category, the model information including location information of a part of the subject model, and a correction data set storage unit configured to store a plurality of correction data sets, each of the plurality of correction data sets including a plurality of first partial images being based on an image including a subject and feature vectors of second partial images being generated by processing the first partial images, the method comprising:
- detecting a first region of the subject from an input image by referring to the model information;
- detecting a second region of the part of the subject, corresponding to the part of the subject model, in the first region by referring to the model information;
- determining a partial image for which an image correction is to be performed, the partial image including at least the detected first region of the subject in the input image;
- selecting, from the correction data set storage unit, at least one of the correction data sets on the basis of relative position between the partial image determined by the determining step and the second region;
- extracting a feature vector from the partial image determined in said determining step;
- calculating degrees of similarities between the feature vector extracted in the extracting step and feature vectors of the second partial images in the selected correction data set:
- selecting at least one feature vector of the second partial image on the basis of the calculated degrees of similarities; and
- correcting the partial image determined in said determining step using the first partial image corresponding to the selected feature vector of the second partial image.

12. A non-transitory computer-readable storage medium storing a program that causes a computer to function as each unit of an image processing apparatus of claim 1.

13. An image capturing apparatus comprising:
- an image capturing unit adapted to capture an image; and
- an image processing apparatus of claim 1 configured to process an input image that is the image captured by said image capturing unit.

* * * * *